(12) United States Patent
Noh et al.

(10) Patent No.: US 12,294,871 B2
(45) Date of Patent: May 6, 2025

(54) METHOD AND APPARATUS FOR SIGNAL TRANSMISSION AND RECEPTION IN COMMUNICATION SYSTEM

(71) Applicant: ELECTRONICS AND TELECOMMUNICATIONS RESEARCH INSTITUTE, Daejeon (KR)

(72) Inventors: Hoon Dong Noh, Daejeon (KR); Moon Sik Lee, Daejeon (KR); Jae Woo Park, Daejeon (KR); Jae Seung Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 555 days.

(21) Appl. No.: 17/674,656

(22) Filed: Feb. 17, 2022

(65) Prior Publication Data

US 2022/0272547 A1    Aug. 25, 2022

(30) Foreign Application Priority Data

Feb. 19, 2021   (KR) .................. 10-2021-0022871
Feb. 14, 2022   (KR) .................. 10-2022-0018897

(51) Int. Cl.
*H04B 7/155*  (2006.01)
*H04B 7/026*  (2017.01)
(Continued)

(52) U.S. Cl.
CPC .......... *H04W 16/28* (2013.01); *H04W 24/08* (2013.01); *H04W 72/0446* (2013.01); *H04W 72/20* (2023.01)

(58) Field of Classification Search
CPC . H04W 16/28; H04W 24/08; H04W 72/0446; H04W 72/20; H04B 7/15528
See application file for complete search history.

(56) References Cited

U.S. PATENT DOCUMENTS 8,824,354 B2   9/2014   Ji et al.
8,934,396 B2   1/2015   Noh et al.
(Continued)

FOREIGN PATENT DOCUMENTS

KR   10-0777942 B1   11/2007

OTHER PUBLICATIONS

3GPP TSG RAN WG1 Meeting#90, R1-1712223 Title:UL beam management (Year: 2017).*

(Continued)

*Primary Examiner* — Faruk Hamza
*Assistant Examiner* — Abusayeed M Haque
(74) *Attorney, Agent, or Firm* — Rabin & Berdo, P.C.

(57) ABSTRACT

An operation method of a repeater performing relaying between a base station and a first terminal in a communication system may comprise: receiving one or more signals from at least one of the base station and the first terminal; performing monitoring on the one or more signals in a time interval for which a transmission direction is not determined by the base station; and determining the transmission direction of the time interval based on a result of the monitoring, wherein the one or more signals include at least one of a first signal received from the base station or a second signal received from the first terminal.

16 Claims, 20 Drawing Sheets

(51) Int. Cl.
    *H04W 16/28*     (2009.01)
    *H04W 24/08*     (2009.01)
    *H04W 72/0446*     (2023.01)
    *H04W 72/20*     (2023.01)

(56) References Cited

U.S. PATENT DOCUMENTS

| | | | |
|---|---|---|---|
| 10,892,883 B2 | 1/2021 | Luo et al. | |
| 10,951,383 B2* | 3/2021 | Lu | H04L 5/0094 |
| 2019/0199422 A1* | 6/2019 | Li | H04W 72/046 |
| 2020/0162208 A1 | 5/2020 | Moon et al. | |
| 2020/0275412 A1 | 8/2020 | Kim | |
| 2020/0288446 A1 | 9/2020 | Lee | |
| 2020/0396679 A1* | 12/2020 | Akkarakaran | H04W 72/044 |
| 2020/0412519 A1* | 12/2020 | Krishnaswamy | H04B 7/0695 |
| 2021/0029764 A1 | 1/2021 | Larsson et al. | |
| 2021/0227410 A1* | 7/2021 | Xu | H04W 72/1263 |
| 2022/0070922 A1* | 3/2022 | Talarico | H04W 74/0808 |

OTHER PUBLICATIONS

3GPP TSG RAN WG1 Meeting#92, R1-1801321 Title:LS on supporting power sharing (Year: 2018).*
3GPP TS 38.211 V16.4.0 (Dec. 2020), 3rd Generation Partnership Project; Technical Specification Group Radio Access Network; NR; Physical channels and modulation (Release 16), pp. 1-133.
3GPP TS 38.212 V16.4.0 (Dec. 2020), 3rd Generation Partnership Project; Technical Specification Group Radio Access Network; NR; Multiplexing and channel coding (Release 16), pp. 1-152.
3GPP TS 38.213 V16.4.0 (Dec. 2020), 3rd Generation Partnership Project; Technical Specification Group Radio Access Network; NR; Physical layer procedures for control (Release 16), pp. 1-181.
3GPP TS 38.214 V16.4.0 (Dec. 2020), 3rd Generation Partnership Project; Technical Specification Group Radio Access Network; NR; Physical layer procedures for data (Release 16), pp. 1-169.

* cited by examiner

FIG. 10

| | Oct 1 | Oct 2 | Oct 3 | ... | Oct N |
|---|---|---|---|---|---|

| serving cell ID | | BWP ID | $T_0$ | $T_8$ | ... | $T_{(N-2)\times 8}$ |
| | | | $T_1$ | $T_9$ | | $T_{(N-2)\times 8+1}$ |
| | | | $T_2$ | $T_{10}$ | | $T_{(N-2)\times 8+2}$ |
| | | | $T_3$ | $T_{11}$ | | $T_{(N-2)\times 8+3}$ |
| | | | $T_4$ | $T_{12}$ | | $T_{(N-2)\times 8+4}$ |
| | | | $T_5$ | $T_{13}$ | | $T_{(N-2)\times 8+5}$ |
| | | | $T_6$ | $T_{14}$ | | $T_{(N-2)\times 8+6}$ |
| CORESET pool ID | | | $T_7$ | $T_{15}$ | | $T_{(N-2)\times 8+7}$ | user plane protocol stack control plane protocol stack

METHOD AND APPARATUS FOR SIGNAL TRANSMISSION AND RECEPTION IN COMMUNICATION SYSTEM

CROSS-REFERENCE TO RELATED APPLICATIONS

This application claims priority to Korean Patent Applications No. 10-2021-0022871 filed on Feb. 19, 2021 and No. 10-2022-0018897 filed on Feb. 14, 2022 with the Korean Intellectual Property Office (KIPO), the entire contents of which are hereby incorporated by reference.

BACKGROUND

1. Technical Field

The present disclosure relates to a signal transmission and reception technique in a wireless communication system, and more particularly, to a signal transmission and reception technique for transmitting and receiving signals by using a wireless repeater for coverage extension.

2. Related Art

With the development of information and communication technology, various wireless communication technologies are being developed. Representative wireless communication technologies include long term evolution (LTE) and new radio (NR) defined as the $3^{rd}$ generation partnership project (3GPP) standards. The LTE may be one of $4^{th}$ generation (4G) wireless communication technologies, and the NR may be one of $5^{th}$ generation (5G) wireless communication technologies.

WiFi or LTE repeaters can clearly determine an uplink (UL) or downlink (DL) direction when amplifying and retransmitting radio signals. This is because the WiFi or LTE repeaters can statically determine a DL-UD pattern of a corresponding frequency band when operating in a frequency band operated based on a frequency division duplex (FDD) scheme or even when operating in a frequency band operated based on a time division duplex (TDD) scheme. On the other hand, in case of the 5G system, various vertical applications such as ultra-reliable low-latency communication (URLLC) may be supported, and a semi-static or dynamic DL-UL pattern may be used to actively respond to dynamic changes in UL/DL traffic. Therefore, conventional TDD repeaters may not be able to respond to a varying DL-UL pattern when amplifying and retransmitting radio signals, or an error may occur in determining the transmission direction. In addition, severe DL-UL cross-link interference may be caused in the wireless network.

SUMMARY

In order to solve the above-identified problems, exemplary embodiments of the present disclosure are directed to providing a method and an apparatus of determining a UL/DL direction for a TDD repeater in a communication system.

According to an exemplary embodiment of the present disclosure for achieving the above-described objective, an operation method of a repeater performing relaying between a base station and a first terminal in a communication system may comprise: receiving one or more signals from at least one of the base station and the first terminal; performing monitoring on the one or more signals in a time interval for which a transmission direction is not determined by the base station; and determining the transmission direction of the time interval based on a result of the monitoring, wherein the one or more signals include at least one of a first signal received from the base station or a second signal received from the first terminal.

The operation method may further comprise retransmitting the first signal to the first terminal when the result of the monitoring indicates that the first signal is detected only by a first antenna included in the repeater, and retransmitting the second signal to the base station when the result of the monitoring indicates that the second signal is detected only by a second antenna included in the repeater, wherein the first antenna is an antenna wirelessly connected to the base station, and the second antenna is an antenna wirelessly connected to the first terminal.

The operation may further comprise, when the result of the monitoring indicates that signals are respectively received by a first antenna and a second antenna included in the repeater, retransmitting the first signal detected by the first antenna to the first terminal, and retransmitting the second signal detected by the second antenna to the base station, wherein the first antenna is an antenna wirelessly connected to the base station, and the second antenna is an antenna wirelessly connected to the first terminal.

The operation method may further comprise, when the result of the monitoring indicates that signals are respectively received by a first antenna and a second antenna included in the repeater, retransmitting only the second signal detected by the second antenna to the base station, wherein the first antenna is an antenna wirelessly connected to the base station, and the second antenna is an antenna wirelessly connected to the first terminal.

According to another exemplary embodiment of the present disclosure for achieving the above-described objective, an operation method of a repeater performing relaying between a base station and a first terminal in a communication system may comprise: receiving slot format information from the base station; monitoring one or more reception signals in a time interval for which a transmission direction is not determined based on the slot format information; and determining the transmission direction of the time interval based on a result of the monitoring, wherein the one or more reception signals include at least one of a first reception signal received from the base station or a second reception signal received from the first terminal, and the slot format information includes at least one of cell-specific slot format information, terminal-specific slot format information, control information including a slot format indication (SFI), or a combination thereof.

At least one of the cell-specific slot format information, the terminal-specific slot format information, or the control information may be decoded by a signal processing unit included in the repeater.

The time interval may be determined based on a decoding range for the slot format information, may be a time interval for which a transmission direction is not determined according to the cell-specific slot format information when only the cell-specific slot format information is decoded, may be a time interval for which a transmission direction is not determined according to the terminal-specific slot format information when the cell-specific slot format information and the terminal-specific slot format information are decoded, and may be a time interval excluding a time interval for which the control information indicates a transmission direction when only the control information is decoded.

The transmission direction of the time interval may be determined based on at least one of a signal strength, signal quality, signal-to-noise ratio, signal-to-interference plus noise ratio, reception time interval, or envelope detection of a reception strength for the one or more reception signals.

The transmission direction of the time interval may be determined as a downlink direction when one of first and second antennas included in the repeater by which the monitoring is performed is the first antenna, and may be determined as an uplink direction when one of the first and second antennas included in the repeater by which the monitoring is performed is the second antenna, wherein the first antenna is an antenna wirelessly connected to the base station, and the second antenna is an antenna wirelessly connected to the first terminal.

The transmission direction of the time interval may be determined as a downlink direction when one of first and second antenna included in the repeater by which a reception signal is detected is the first antenna, and may be determined as an uplink direction when one of the first and second antenna included in the repeater by which a reception signal is detected is the second antenna, wherein the first antenna is an antenna wirelessly connected to the base station, and the second antenna is an antenna wirelessly connected to the first terminal.

The determining of the transmission direction of the time interval may comprise: when both a first antenna and a second antenna included in the repeater detect reception signals, determining that a signal received by the first antenna is an interference signal from a second terminal not serviced by the repeater; and determining the transmission direction of the time interval as an uplink direction, wherein the first antenna is an antenna wirelessly connected to the base station, and the second antenna is an antenna wirelessly connected to the first terminal.

When a strength of the signal received by the first antenna is X dB or less, the signal received by the first antenna may be determined as an interference signal from the second terminal, X may be a value obtained by subtracting a signal attenuation value measured by the repeater and a margin value from a transmission power of the base station, and the margin value may be a value set by at least one of higher layer signaling or the control information.

According to yet another exemplary embodiment of the present disclosure for achieving the above-described objective, a repeater performing relaying between a base station and a first terminal in a communication system may comprise: a processor; a memory electronically communicating with the processor; and instructions stored in the memory, wherein when executed by the processor, the instructions cause the repeater to: receive slot format information from the base station; monitor one or more reception signals in a time interval for which a transmission direction is not determined based on the slot format information; and determine the transmission direction of the time interval based on a result of the monitoring, wherein the one or more reception signals include at least one of a first reception signal received from the base station or a second reception signal received from the first terminal, and the slot format information includes at least one of cell-specific slot format information, terminal-specific slot format information, control information including a slot format indication (SFI), or a combination thereof.

At least one of the cell-specific slot format information, the terminal-specific slot format information, or the control information may be decoded by a signal processing unit included in the repeater.

The time interval may be determined based on a decoding range for the slot format information, may be a time interval for which a transmission direction is not determined according to the cell-specific slot format information when only the cell-specific slot format information is decoded, may be a time interval for which a transmission direction is not determined according to the terminal-specific slot format information when the cell-specific slot format information and the terminal-specific slot format information are decoded, and may be a time interval excluding a time interval for which the control information indicates a transmission direction when only the control information is decoded.

The transmission direction of the time interval may be determined based on at least one of a signal strength, signal quality, signal-to-noise ratio, signal-to-interference plus noise ratio, reception time interval, or envelope detection of a reception strength for the one or more reception signals.

The transmission direction of the time interval may be determined as a downlink direction when one of first and second antennas included in the repeater by which the monitoring is performed is the first antenna, and may be determined as an uplink direction when one of the first and second antennas included in the repeater by which the monitoring is performed is the second antenna, wherein the first antenna is an antenna wirelessly connected to the base station, and the second antenna is an antenna wirelessly connected to the first terminal.

The transmission direction of the time interval may be determined as a downlink direction when one of first and second antenna included in the repeater by which a reception signal is detected is the first antenna, and may be determined as an uplink direction when one of the first and second antenna included in the repeater by which a reception signal is detected is the second antenna, wherein the first antenna is an antenna wirelessly connected to the base station, and the second antenna is an antenna wirelessly connected to the first terminal.

In the determining of the transmission direction of the time interval, the instructions may further cause the repeater to: when both a first antenna and a second antenna included in the repeater detect reception signals, determine that a signal received by the first antenna is an interference signal from a second terminal not serviced by the repeater; and determine the transmission direction of the time interval as an uplink direction, wherein the first antenna is an antenna wirelessly connected to the base station, and the second antenna is an antenna wirelessly connected to the first terminal.

When a strength of the signal received by the first antenna is X dB or less, the signal received by the first antenna may be determined as an interference signal from the second terminal, X may be a value obtained by subtracting a signal attenuation value measured by the repeater and a margin value from a transmission power of the base station, and the margin value may be a value set by at least one of higher layer signaling or the control information.

According to the present disclosure, when the TDD repeater cannot obtain all of UL/DL configuration or indication information of the base station, the repeater can determine a UL/DL direction for efficiently amplifying and retransmitting radio signals. Accordingly, the coverage of the TDD network in which a DL-UL pattern is semi-statically or dynamically changed can be extended through the repeater.

BRIEF DESCRIPTION OF DRAWINGS

FIG. 10 is a conceptual diagram illustrating an exemplary embodiment of a TCI state activation/deactivation MAC CE in a communication system.

DETAILED DESCRIPTION OF THE EMBODIMENTS

Figure 1:
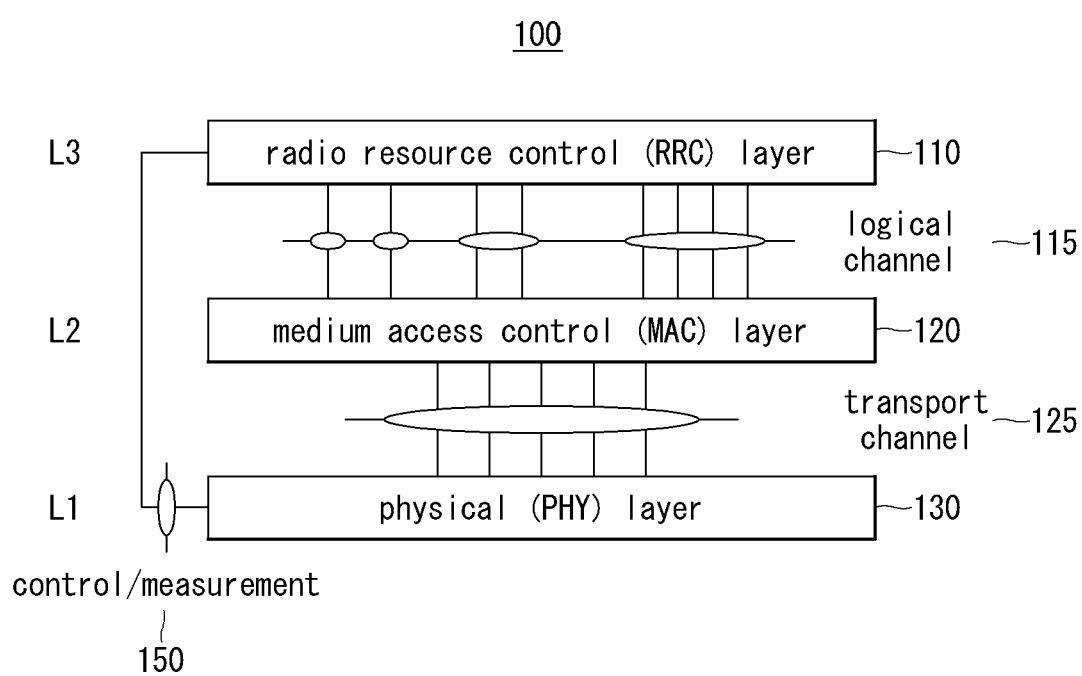
FIG. 1 is a conceptual diagram illustrating an exemplary embodiment of a radio interface protocol structure in a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a radio interface protocol structure in a communication system.

Referring to FIG. 1, an exemplary embodiment of a radio interface protocol structure 100 of a communication system may be configured to include a radio resource control (RRC) layer 110, a medium access control (MAC) layer 120, a physical (PHY) layer 130, and the like. An exemplary embodiment of the radio interface protocol structure 100 shown in FIG. 1 may correspond to various exemplary embodiments of interfaces such as an interface between a terminal and a base station, an interface between an IAB-node distributed unit (IAB-DU) and an IAB-node mobile terminal (IAB-MT) of an integrated access backhaul (IAB) network, an interface between an IAB-DU and a lower node, an interface between an IAB-MT and an upper node, an interface between a plurality of terminals, and the like.

In the vicinity of the PHY layer 130, the RRC layer 110, and the MAC layer 120, and the like may be disposed above the PHY layer 130. For example, the MAC layer 120 may be disposed above the PHY layer 130. The RRC layer 110 may be disposed above the MAC layer 120.

The MAC layer 120 may be connected to a higher layer (e.g., RRC layer 110) through logical channels 115. The PHY layer 130 may be connected to the higher MAC layer 120 through transport channels 125. The PHY layer 130 may transmit and receive control information or measurement information 150 to and from the RRC layer 110.

The PHY layer 130 may be referred to as a 'layer 1' or 'L1'. The MAC layer 120 may be referred to as a 'layer 2' or 'L2'. The RRC layer 110 may be referred to as a 'layer 3' or 'L3'. The RRC layer 110 and the MAC layer 120 may be collectively referred to as the 'higher layer'.

In the present disclosure, 'L1 signaling' refers to signaling such as downlink control information (DCI) transmitted on a physical downlink control channel (PDCCH), uplink control information (UCI) transmitted on a physical uplink control channel (PUCCH), and sidelink control information (SCI) transmitted on a physical sidelink control channel (PSCCH), which are channels of the PHY layer 130. Similarly, in the present disclosure, 'higher layer signaling' may include L2 signaling transmitted through a MAC control element (CE), L3 signaling transmitted through RRC signaling, and the like.

In a communication system to which the 5G communication technology, etc. is applied, one or more of numerologies of Table 1 may be used in accordance with various purposes, such as inter-carrier interference (ICI) reduction according to frequency band characteristics, latency reduction according to service characteristics, and the like.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Table 1 is merely an example for the convenience of description, and exemplary embodiments of the numerologies used in the communication system may not be limited thereto. Each numerology μ may correspond to information of a subcarrier spacing (SCS) Δf and a cyclic prefix (CP). The terminal may identify a numerology μ and a CP value applied to a downlink bandwidth part (BWP) or an uplink BWP based on higher layer parameters such as subcarrier-Spacing, cyclicPrefix, and/or the like.

Figure 2:
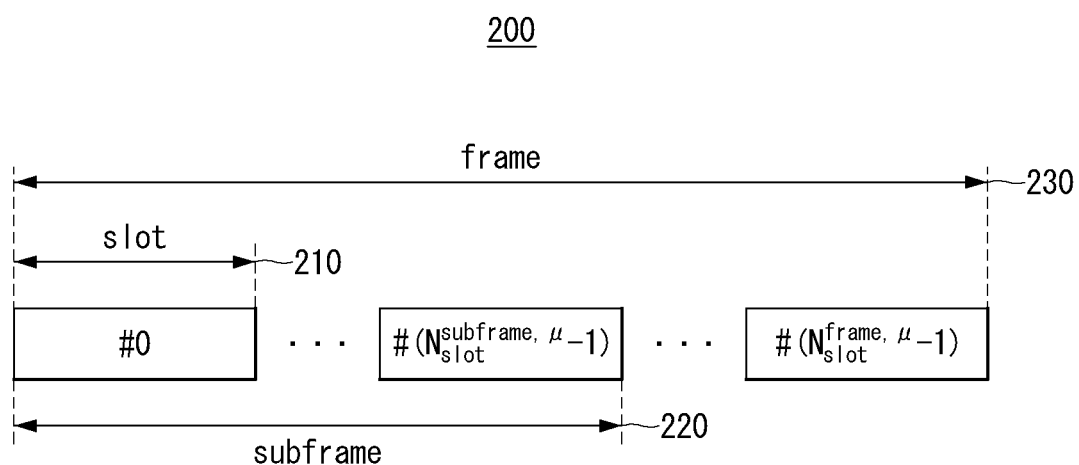
FIG. 2 is a conceptual diagram illustrating an exemplary embodiment of time resources in which radio signals are transmitted in a communication system.

FIG. 2 is a conceptual diagram illustrating an exemplary embodiment of time resources in which radio signals are transmitted in a communication system.

Referring to FIG. 2, time resources in which radio signals are transmitted in a communication system 200 may be represented with a frame 220 comprising one or more ($N_{slot}^{frame,\mu}/N_{slot}^{subframe,\mu}$) subframes, a subframe 220 comprising one or more ($N_{slot}^{subframe,\mu}$) slots, and a slot 210 comprising 14 ($N_{symb}^{slot}$) OFDM symbols. In this case, according to a configured numerology, as the values of $N_{symb}^{slot}$, $N_{slot}^{subframe,\mu}$, and $N_{slot}^{frame,\mu}$, values according to Table 2 below may be used in case of a normal CP, and values according to Table 3 below may be used in case of an extended CP. The OFDM symbols included within one slot may be classified into 'downlink', 'flexible', or 'uplink' by higher layer signaling or a combination of higher layer signaling and L1 signaling.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the 5G NR communication system, the frame 230 may have a length of 10 ms, and the subframe 220 may have a length of 1 ms. Each frame 230 may be divided into two half-frames having the same length, and the first half-frame (i.e., half-frame 0) may be composed of subframes #0 to #4, and the second half-frame (i.e., half-frame 1) may be composed of subframes #5 to #9. One carrier may include a set of frames for uplink (i.e., uplink frames) and a set of frames for downlink (i.e., downlink frames).

Figure 3:
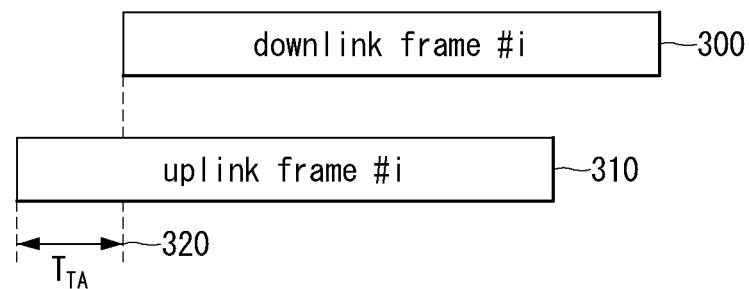
FIG. 3 is a conceptual diagram illustrating a time difference between a reception timing of an i-th downlink frame and a transmission timing of an i-th uplink frame in an exemplary embodiment of a communication system.

FIG. 3 is a conceptual diagram illustrating a time difference between a reception timing of an i-th downlink frame and a transmission timing of an i-th uplink frame in an exemplary embodiment of a communication system.

Referring to FIG. 3, a time difference between a reception timing of an i-th downlink frame 300 and a transmission timing of an i-th uplink frame 310 may be a $T_{TA}$ 320. Accordingly, the terminal may start transmission of the uplink frame #i 310 at a time earlier by $T_{TA}$ compared to the reception timing of the downlink frame #i 300. $T_{TA}$ may be referred to as a timing advance or timing adjustment TA. The base station may instruct the terminal to change a value of $T_{TA}$ through higher layer signaling or L1 signaling, and may configure the terminal to apply $T_{TA}$ in a manner defined as $T_{TA}=(N_{TA}+N_{TA,offset})T_c$. In the case of 5G NR, $T_c$ may be defined as $$T_c = \frac{1}{(\Delta f_{max} \cdot N_f)},$$

$\Delta f_{max}$ may be defined as $\Delta f_{max}$=480 kHz, $N_f$ may be defined as $N_f$=4096, $N_{TA,offset}$ may be a value set by L3 signaling, and $N_{TA}$ may be a value determined by Equation 1 below by a value $T_A$ indicated by L2 signaling.

$$N_{TA} = \begin{cases} T_A \cdot 16 \cdot \frac{64}{2^\mu} \text{ (for random access response)} \\ N_{TA\_old} + ((T_A - 31) \cdot 16 \cdot 64/2^\mu) \text{ (for other cases)} \end{cases} \quad \text{[Equation 1]}$$

Here, the description on $N_{TA,offset}$ and $N_{TA}$ may be an example for a specific situation, and various other options may exist, but in order not to obscure the gist of the description, all possible cases may not be listed in the present disclosure.

Figure 4:
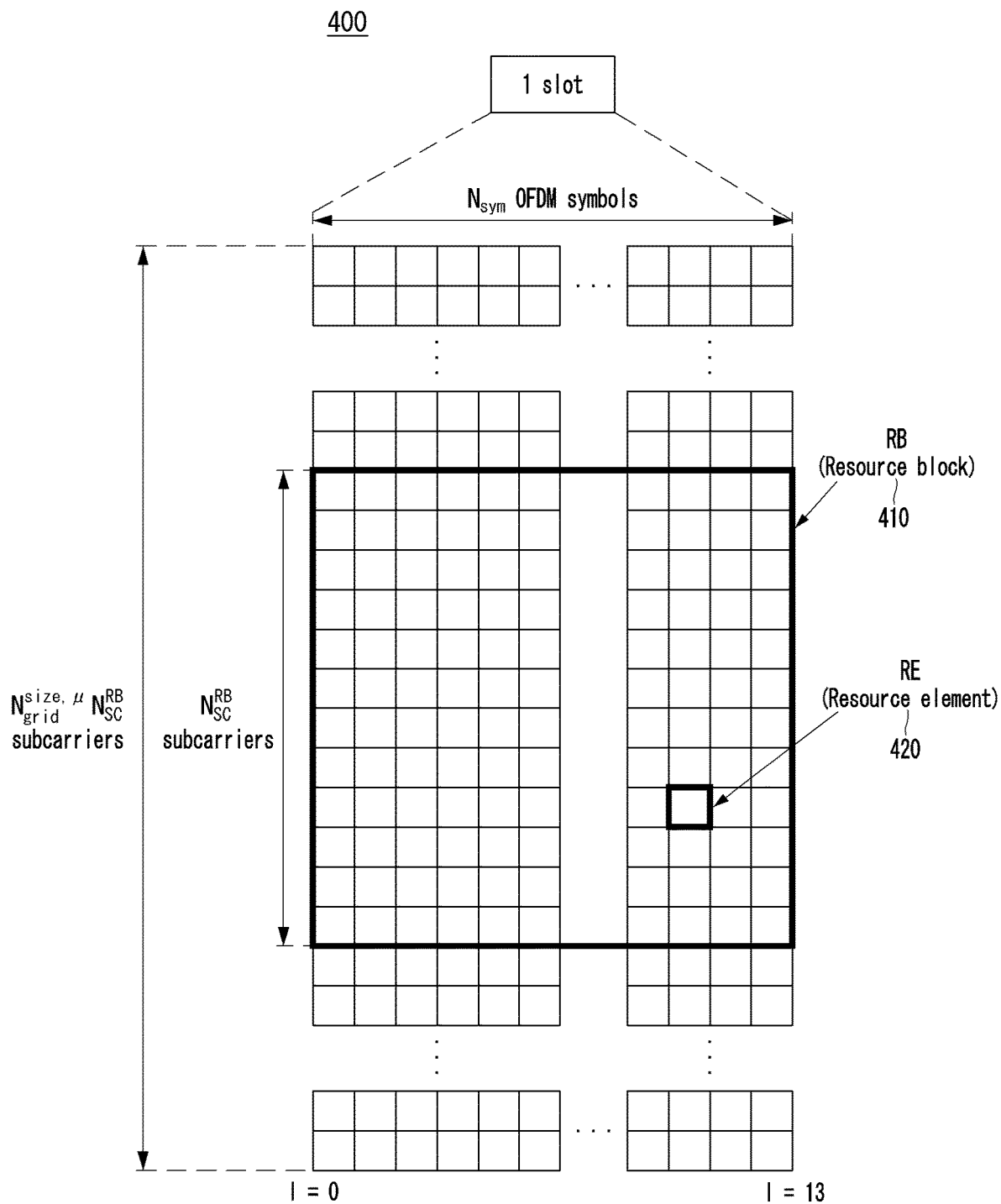
FIG. 4 is a conceptual diagram illustrating an exemplary embodiment of a time/frequency resource grid of a communication system.

FIG. 4 is a conceptual diagram illustrating an exemplary embodiment of a time/frequency resource grid of a communication system.

Referring to FIG. 4, a time/frequency resource grid 400 of a communication system may have $N_{grid}^{size,\mu} N_{sc}^{RB}$ subcarriers and $N_{slot}^{subframe,\mu}$ OFDMs. The resource grid may be defined for each numerology and each carrier. In this case, $N_{grid}^{start,\mu}$ may mean a position of a common resource block (CRB) indicated by higher layer signaling. $N_{grid}^{size,\mu}$ may mean the number of resource blocks (RBs) starting from the CRB, that is, a carrier bandwidth. $N_{grid}^{start,\mu}$ and/or $N_{grid}^{size,\mu}$ may have different values for each link direction (e.g., uplink, downlink, or sidelink) or for each numerology μ. Here, the numerology μ may be referred to by other terms, such as a SCS configuration, if necessary.

Each element in the resource grid for an antenna port p and a SCS configuration μ may be referred to as a resource element (RE) 420, and may be uniquely defined for each position $(k,l)_{p,\mu}$. In this case, k may be a frequency axis index, and l may indicate a symbol position on the time axis. $RE(k,l)_{p,\mu}$ may correspond to a physical resource used to transmit a physical channel or a signal complex value $a_{k,l}^{(p,\mu)}$. One RB 410 may be defined as consecutive $N_{sc}^{RB}$=12 subcarriers on the frequency axis.

The 5G NR communication system has introduced the concept of BWPs in order to reduce high implementation complexity and power consumption of terminals due to the widened carrier bandwidth compared to the 3G/4G communication system. One BWP may be composed of contiguous CRBs, a starting RB position $N_{BWP,i}^{start,\mu}$ of the BWP and the number $N_{BWP,i}^{size,\mu}$ of RBs constituting the BWP may satisfy Equations 2 and 3.

$$N_{grid,x}^{start,\mu} \le N_{BWP,i}^{start,\mu} < N_{grid,x}^{start,\mu} + N_{grid,x}^{size,\mu} \quad \text{[Equation 2]}$$

$$N_{grid,x}^{start,\mu} < N_{BWP,i}^{start,\mu} + N_{BWP,i}^{size,\mu} \le N_{grid,x}^{start,\mu} + N_{grid,x}^{size,\mu} \quad \text{[Equation 3]}$$

The terminal may be configured with up to four downlink BWPs within one component carrier (CC), and only one downlink BWP may be activated at a time. The terminal may not receive a physical downlink shared channel (PDSCH), a physical downlink control channel (PDCCH), a channel state information reference signal (CSI-RS), or the like outside the activated BWP.

The terminal may be configured with up to four uplink BWPs within one CC, and only one uplink BWP may be activated at a time. The terminal may not transmit a physical uplink shared channel (PUSCH), a physical uplink control channel (PUCCH), a sounding reference signal (SRS), or the like outside the activated BWP.

Figure 5:
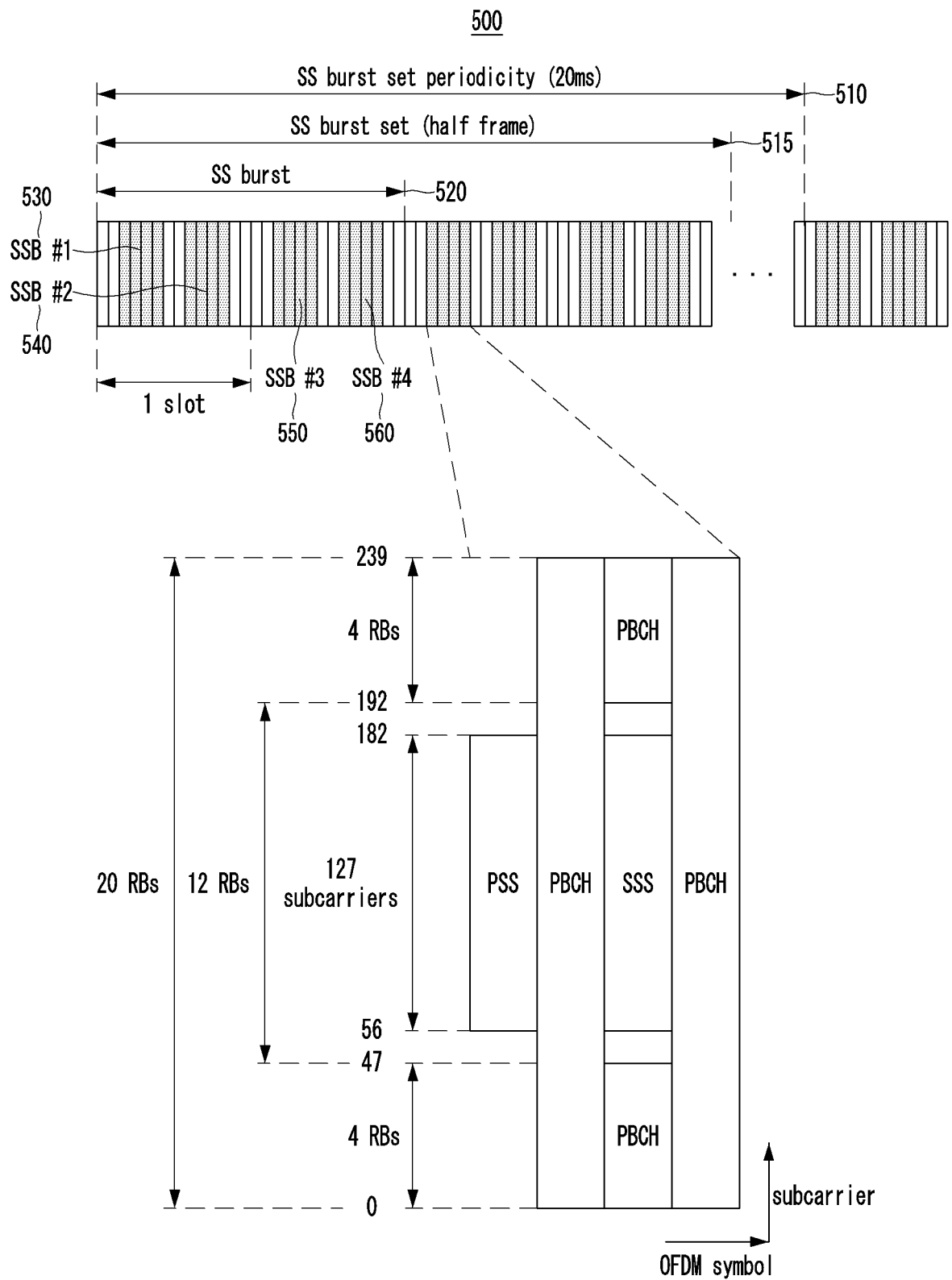
FIG. 5 is a conceptual diagram illustrating an exemplary embodiment of a synchronization signal and physical broadcast channel (SS/PBCH) block or synchronization signal block (SSB) of a communication system.

FIG. 5 is a conceptual diagram illustrating an exemplary embodiment of a synchronization signal and physical broadcast channel (SS/PBCH) block or synchronization signal block (SSB) of a communication system.

Referring to FIG. 5, an SS/PBCH block 500 of a communication system may be configured with a primary synchronization signal (PSS) transmitted in 127 subcarriers in the middle of a first OFDM symbol, a secondary synchronization signal (SSS) transmitted in 127 subcarriers in the middle of a third OFDM symbol, and a physical broadcast channel (PBCH) transmitted in second, third, and fourth OFDM symbols. The PBCH occupying the widest bandwidth may be transmitted over 20 RBs, which may be 3.6 MHz based on 15 kHz SCS. The base station transmits one SSB by applying the same beam. When the number of base station antennas increases or it is necessary to operate multiple beams such as applying one or more analog beams for high frequency support, the base station may support a multi-beam operation by transmitting multiple SSBs. Here, the term 'beam' may be expressed in various terms such as a transmission precoding or a spatial transmission (TX) filter when applied in practice. However, in order not to obscure the gist of the description, 'beam' is used hereinafter as a unified term.

For example, the base station may transmit a plurality of SSBs 530, 540, 550, and 560 to represent a plurality of beams (e.g., beam #1, beam #2, beam #3, beam #4). In this case, it may be possible that one or more SSBs are transmitted within one slot according to a pattern predetermined according to each numerology. The SSBs 530, 540, 550, and 560 to which different beams are applied may be bundled into one set by being included in an SS burst 520. The terminal may assume a half-frame window having a length of 5 ms at the time of monitoring SSBs. An SS burst set 515 configured by higher layer signaling within a half-frame may include one or more SS bursts 520. If RRC configuration values are unknown or unavailable when performing initial access (IA), the terminal may receive or measure the SSBs assuming that a periodicity of the SS burst set 510 is 20 ms. As an example, the terminal may receive SSB(s) with reference to SSB configuration information identical or similar to that shown in Table 4.

TABLE 4

```
MIB ::=                         SEQUENCE {
    systemFrameNumber           // system frame number
    subCarrierSpacingCommon     // cell-specific numerology information
    ssb-SubcarrierOffset        // SSB subcarrier offset (0~15)
    dmrs-TypeA-Position         // DMRS start position information
    pdcch-ConfigSIB1            // PDCCH configuration for SIB1
    cellBarred
    intraFreqReselection
    spare
}
MeasObjectNR ::=                SEQUENCE {
    ssbFrequency                // Absolute Radio Frequency Channel Number (ARFCN) of SSB
    ssbSubcarrierSpacing        // Numerology of SSB
    smtc1
        // first SSB measurement timing configuration (SMTC) configured with reference to SSB-MTC
    smtc2  // Second SMTC configured with reference to SSB-MTC
    ...
    ...
}
SSB-Index                       // SSB index within SS-burst
SSB-MTC ::=                     SEQUENCE {
    // timing occasion configuration for SSBs to be measured by terminal
        periodicityAndOffset            CHOICE {
        sf5         // offset when a SSB reception window has a legnth of 5 subframes
        sf10        // offset when a SSB reception window has a legnth of 10 subframes
        sf20        // offset when a SSB reception window has a legnth of 20 subframes
        sf40        // offset when a SSB reception window has a legnth of 40 subframes
        sf80        // offset when a SSB reception window has a legnth of 80 subframes
        sf160       // offset when a SSB reception window has a legnth of 160 subframes
    },
    duration    // a lengh of a SSB recepion window (number of subframes)
}
SSB-MTC2 ::=                    SEQUENCE {
    pci-List                    // physical cell IDs (PCIs) following the SMTC configuration
    periodicity                 // SMTC periodicity (number of subframes)
}
```

Figure 6:
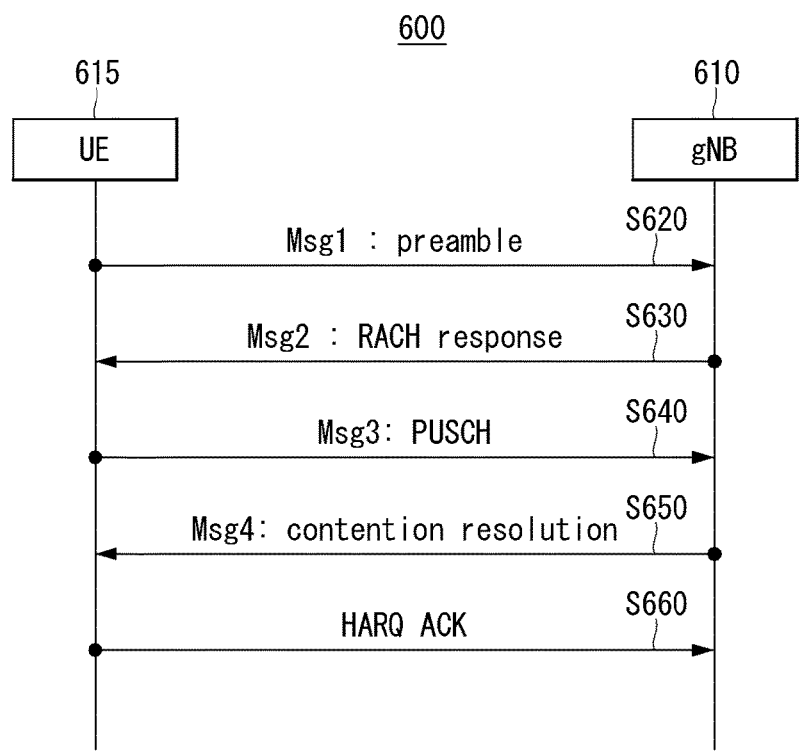
FIG. 6 is a sequence chart illustrating an exemplary embodiment of a random access procedure in a communication system.

FIG. 6 is a sequence chart illustrating an exemplary embodiment of a random access procedure in a communication system.

Referring to FIG. 6, in a random access procedure of a communication system 600, a terminal 615 may transmit a physical random access channel (PRACH) preamble, and the PRACH preamble may be referred to as 'Msg1' (S620). Through a transmission of the PRACH preamble, random access-radio network temporary identifier (RA-RNTI) may be determined. In this case, the RA-RNTI may be calculated by Equation 4.

$$RA-RNTI = 1 + s\_id + 14 \times t\_id + \qquad \text{[Equation 4]}$$
$$14 \times 80 \times f\_id + 14 \times 80 \times 8 \times ul\_carrier\_id$$

In Equation 4, s_id may be an index of a first OFDM symbol of a corresponding PRACH occasion (e.g., $0 \leq s\_id < 14$), t_id may be an index of a first slot of the PRACH occasion within a system frame (e.g., $0 \leq t\_id < 80$), f_id may be an index of the PRACH occasion in the time domain (e.g., $0 \leq f\_id < 8$), and ul_carrier_id may be a value according to a uplink carrier type used for the preamble transmission (e.g., 0 indicates a regular uplink carrier, 1 indicates a supplementary uplink carrier).

Before the terminal transmits the PRACH preamble, the terminal may have at least part of the following information by receiving system information from the base station on a PBCH or receiving RRC signaling from the base station.

PRACH preamble format

Time/frequency resource information for RACH transmission

Index for a logical root sequence table

Cyclic shift $N_{CS}$

Set type (unrestricted, restricted set A, restricted set B)

Referring again to FIG. 6, as a second procedure, the base station may provide a random access response (RAR) to the terminal, which may be referred to as 'Msg2' (S630). Particularly, the base station may calculate an RA-RNTI based on Equation 4 when the base station receives the PRACH preamble from the terminal in the step S620, and may transmit a DCI by using the RA-RNTI for scrambling. The terminal may monitor a PDCCH scrambled with the RA-RNTI in a period included in a RACH response window configured by the higher layer in a type 1 PDCCH common search space (CSS). The terminal may receive the PDCCH (or the DCI transmitted from the base station through the PDCCH), and may decode the PDCCH (or the DCI). If the terminal successfully decodes the PDCCH (or the DCI), the terminal may decode a PDSCH including the RAR transmitted from the base station in the step S630. If the terminal succeeds in decoding the RAR, the terminal may identify whether an RA preamble identifier (RAPID) in the RAR matches a RAPID pre-allocated to the terminal.

As a third procedure, the terminal may transmit a PUSCH to the base station, which may be referred to as 'Msg3' (S640). To this end, the terminal may determine whether to apply a transform precoding to transmission of the PUSCH (i.e., whether to apply discrete Fourier transform (DFT)-s-OFDM-based transmission or OFDM-based transmission) based on a higher layer parameter (e.g., msg3-transform-Precoding). Also, the terminal may determine a SCS to be used for transmission of the PUSCH according to a higher layer parameter (e.g., msg3-scs). In this case, the PUSCH of Msg3 may be transmitted through a serving cell to which the PRACH has been transmitted.

As a fourth procedure, the base station may transmit a contention resolution message to the terminal, which may be referred to as 'Msg4' (S650). The terminal may start a timer for receiving the contention resolution message, and may monitor a PDCCH scrambled with a temporary cell-RNTI (TC-RNTI) in the type 1 PDCCH CSS until the timer expires. If the terminal successfully decodes the PDCCH, the terminal may decode a corresponding PDSCH including a MAC CE, and set the TC-RNTI as a cell-RNTI (C-RNTI). After successfully decoding the Msg4, the terminal may report a hybrid automatic repeat request (HARQ) positive-acknowledgement (ACK) thereto to the base station, and may report whether the RACH procedure is successful to the base station (S660).

The RACH occasion (RO) may mean a time and frequency resource specified for reception of a RACH preamble, and the terminal may use the RO for PRACH transmission. As described above, in the 5G NR, multiple SSBs may be associated with different beams for the multi-beam operation, and the terminal may measure the multiple SSBs, and select an optimal SSB (i.e., optimal beam) based on one of various schemes such as a reference signal received power (RSRP), reference signal received quality (RSRQ), signal-to-noise ratio (SNR), signal-to-noise/interference ratio (SNIR), or the like. Thereafter, the terminal may determine a beam (i.e., TX spatial filter) to be used for PRACH transmission based on the beam (i.e., RX spatial filter) used when receiving the optimal SSB. In this case, a relationship between SSB(s) and RO(s) may be established for the purpose of allowing the base station or the network to know which SSB (i.e., beam) the terminal has selected. Through such the relationship, the base station may know the SSB (i.e., beam) selected by the terminal based on the RO in which the terminal has transmitted the PRACH. For example, the relationship between SSB(s) and RO(s) may be determined with reference to the higher layer configurations identical or similar to those shown in Table 5.

TABLE 5

```
RACH-ConfigCommon ::=              SEQUENCE {
    rach-ConfigGeneric             // set of RACH parameters
    totalNumberOfRA-Preambles      // the total number of RACH preambles (1~63)
    ssb-perRACH-OccasionAndCB-PreamblesPerSSB CHOICE {
        oneEighth    // The number of preambles per SSB when one SSB is associated with eight ROs
        oneFourth    // The number of preambles per SSB when one SSB is associated with four ROs
        oneHalf      // The number of preambles per SSB when one SSB is associated with two ROs
        one          // The number of preambles per SSB when one SSB is associated with one RO
        two          // The number of preambles per SSB when two SSBs are associated with one RO
        four         // The number of preambles per SSB when four SSBs are associated with one RO
        eight        // The number of preambles per SSB when eigth SSBs are associated with one RO
        sixteen      // The number of preambles per SSB when sixteen SSBs are associated with one RO
    }
    groupBconfigured               SEQUENCE {
        ra-Msg3SizeGroupA     // The size of a transport block fro contention-based RA of Group A
        messagePowerOffsetGroupB  // Threshold for preamble selection
        numberOfRA-PreamblesGroupA   // The number of CB preambles per SSB of Group A
    }
    ra-ContentionResolutionTimer      // Initial value of a contention resolution timer
    rsrp-ThresholdSSB                 // Threshold for selection of an SSB and an associated RACH resource
    rsrp-ThresholdSSB-SUL             // Threshold for selection of an SSB and an associated RACH resource in
SUL
    prach-RootSequenceIndex                 CHOICE { // RACH root sequence index
        l839
        l139
    },
    msg1-SubcarrierSpacing       // SCS for Msg1 transmission
    restrictedSetConfig          // one of {unrestricted, restricted set A, restricted set B}
```

TABLE 5-continued

| | |
|---|---|
| msg3-transformPrecoder | // whether to apply transform precoding in transmisison of Msg3 |
| ... | |
| } | |
| RACH-ConfigGeneric ::= | SEQUENCE { |
| prach-ConfigurationIndex | // indicates a preamble format, etc. |
| msg1-FDM | // The number of ROs FDMed at a time |
| msg1-FrequencyStart | // frequency-axis offset of the lowest RO with reference to PRB 0 |
| zeroCorrelationZoneConfig | // N-CS configuration |
| preambleReceivedTargetPower | // Target power level at a network receiving node |
| preambleTransMax | |
| // The maximum number of RA preambe transmissions performed unitl declaration of an RA failure | |
| powerRampingStep | // Power ramping step |
| ra-Response Window | // Msg2 (RAR) window length (number of slots) |
| ..., | |
| } | |

Figure 7:
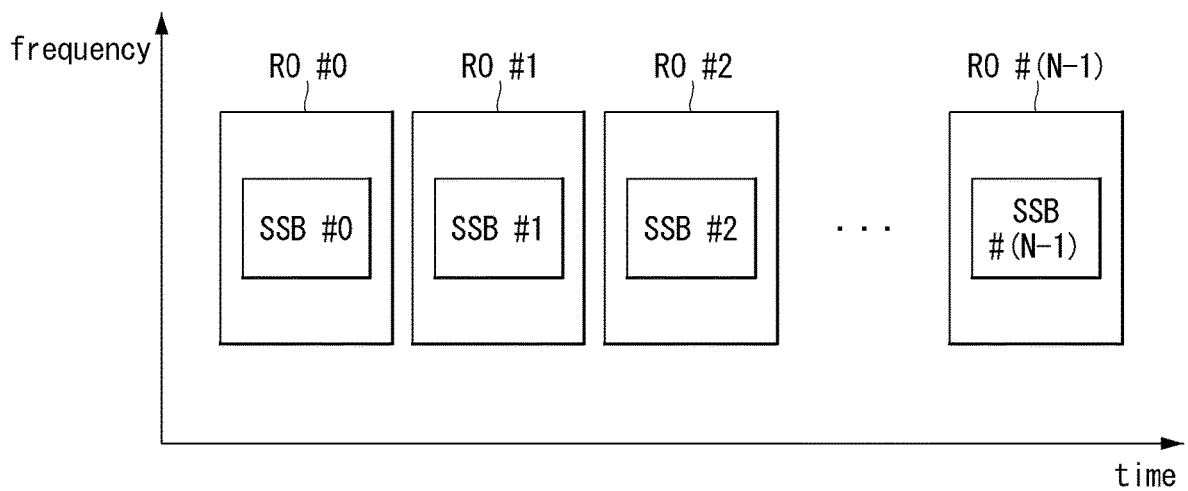
FIG. 7 is a conceptual diagram illustrating a first exemplary embodiment of SSB-RO association according to RACH configuration in a communication system.

FIG. 7 is a conceptual diagram illustrating a first exemplary embodiment of SSB-RO association according to RACH configuration in a communication system.

Referring to FIG. 7, in an SSB-RO mapping relation according to the RACH configurations, in a certain frequency band, N SSBs 710-1 to 710-n having time resources which are separated from each other may be mapped to ROs 720-1 to 720-n having time resources which are separated from each other on a one-to-one basis. For example, if a higher layer parameter msg1-FDM is set to 1 (i.e., msg1-FDM=one) and a higher layer parameter ssb-perRACH-OccasionAndCB-PreamblesPerSSB is set to 1 (e.g., ssb-perRACH-OccasionAndCB-PreamblesPerSSB=one), the N different SSBs 710-1 to 710-n may be mapped to the N different ROs 720-1 to 720-n on a one-to-one basis.

Figure 8:
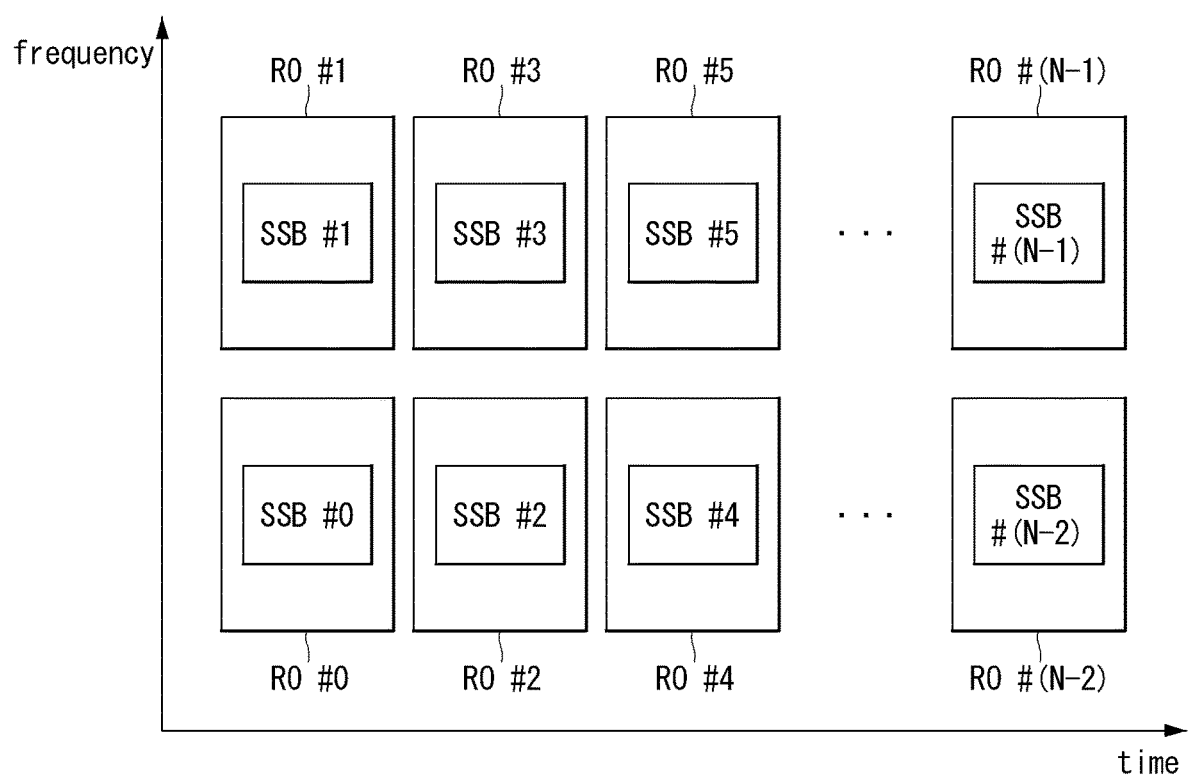
FIG. 8 is a conceptual diagram illustrating a second exemplary embodiment of SSB-RO association according to RACH configuration in a communication system.

FIG. 8 is a conceptual diagram illustrating a second exemplary embodiment of SSB-RO association according to RACH configuration in a communication system.

Referring to FIG. 8, in an SSB-RO mapping relation according to the RACH configurations, in a first frequency band, SSBs 810-1, 810-3, 810-5, . . . , and 810-(n−1) having time resources which are separated from each other may be mapped to ROs 820-1, 820-3, 820-5, . . . , and 820-(n−1) having time resources which are separated from each other on a one-to-one basis. In addition, in a second frequency band, SSBs 810-2, 810-4, 810-6, . . . , and 810-n having time resources which are separated from each other may be mapped to ROs 820-2, 820-4, 820-6, . . . , and 820-n) having time resources which are separated from each other on a one-to-one basis. For example, if the higher layer parameter msg1-FDM is set to 2 (i.e., msg1-FDM=two), and higher layer parameter ssb-perRACH-OccasionAndCB-PreamblesPerSSB is set to 2 (e.g., ssb-perRACH-OccasionAndCB-PreamblesPerSSB=two), the N different SSBs 810-1 to 810-n may be mapped to the N different ROs 820-1 to 820-n which are frequency division multiplexed (FDMed) in the frequency domain, on a one-to-one basis.

Meanwhile, the 5G NR communication system may support DCI formats shown in Table 6 based on Release-16.

TABLE 6

| DCI format | Usage |
|---|---|
| 0_0 | Used for scheduling a PUSCH within one cell |
| 0_1 | Used for scheduling one or more PUSCHs within one cell, or indicating downlink feedback information for a configured grant (CG) PUSCH (i.e., CG-DFI) |
| 0_2 | Used for scheduling a PUSCH within one cell |
| 1_0 | Used for scheduling a PDSCH within one cell |
| 1_1 | Used for scheduling a PDSCH within one cell or triggering a one-shot HARQ-ACK codebook feedback |
| 1_2 | Used for scheduling a PDSCH within one cell |
| 2_0 | Used for notifying a slot format, an available RB set, a channel occupancy time (COT) duration, and search space set group switching to a UE group |
| 2_1 | Used for notifying PRB(s) and OFDM symbol(s) assumed not to be intended to be used for transmission to a UE group |
| 2_2 | Used for transmission of a transmission power control (TPC) for a PUCCH and a PUSCH |
| 2_3 | Used for transmission of a TPC command group for SRS transmission by one or more UEs |
| 2_4 | Used for a UE to notify PRB(s) and OFDM symbol(s) for which UL transmission from the UE is cancelled to a UE group |
| 2_5 | Used for notifying availability of soft resources |
| 2_6 | Used for notifying power saving information outside a DRX active time to one or more UEs |
| 3_0 | Used for NR sidelink scheduling within one cell |
| 3_1 | Used for LTE sidelink scheduling within one cell |

A DCI may include downlink control information for one or more cells, and may be associated with one RNTI. The DCI may be encoded through the order of 1) information element multiplexing, 2) cyclic redundancy check (CRC) addition, 3) channel coding, and 4) rate matching, and decoding may also be performed in consideration of the above steps. In the above description, "a certain DCI is associated with one RNTI" may mean that CRC parity bits of the DCI are scrambled with the RNTI. Referring to Table 6, some DCI may include scheduling information of one or more PUSCHs for a certain cell.

For example, a CRC of the DCI format 0_1 may be scrambled with a C-RNTI, configured scheduling-RNTI (CS-RNTI), semi-persistent CSI RNTI (SP-CSI-RNTI), or modulation coding scheme cell RNTI (MCS-C-RNTI). The DCI format 0_1 may include at least one of the following information.

Identifier for DCI format (1 bit): Indicator indicating a UL DCI format, which is always set to 0 in the case of DCI format 0_1

Carrier indicator (0 or 3 bits): Indicator indicating a CC scheduled by the corresponding DCI DFI flag (0 or 1 bit): Configured grant downlink feedback information (CG-DFI) indicator.

If the DCI format 0_1 is used for CG-DFI indication (when the DFI flag is set to 1), at least one of the following fields may be used:
- HARQ-ACK bitmap (16 bits), where the order of mapping HARQ process indexes within the bitmap is that the HARQ process indexes are mapped from the MSB to the LSB of the bitmap in ascending order. For each bit in the bitmap, a value of 1 indicates ACK, and a value of 0 indicates NACK.
- TPC command for a scheduled PUSCH (2 bits)
- All the remaining bits in the DCI format 0_1 are set to zero If the DCI format 0_1 is not used for CG-DFI indication (when there is no DFI flag field or DFI flag field is set to 0), at least one of the following fields may be used:
- UL/SUL indicator (0 or 1 bit): supplementary UL indicator.
- Bandwidth part indicator (0, 1, or 2 bits): Indicator indicating a BWP to be activated among uplink BWPs configured for the terminal.
- Frequency domain resource assignment: Indicator for allocating a frequency domain resource.
- Time domain resource assignment: Indicator for allocating a time domain resource.
- Frequency hopping flag (0 or 1 bit): Frequency axis hopping indicator
- Modulation and coding scheme (5 bits)
- New data indicator (NDI): Indicator indicating whether allocated data is new data or retransmission data.
- Redundancy version (RV): Indicator indicating an RV value when channel coding is applied to allocated data
- HARQ process number (4 bits): Indicator indicating a HARQ process to be allocated to scheduled data
- TPC command for a scheduled PUSCH (2 bits): TPC indicator
- SRS resource indicator: Aperiodic SRS resource selection indicator
- Precoding information and number of layers: Indicator indicating precoding and the number of transport layers to be used in PUSCH transmission
- Antenna ports: Indicator for uplink antenna ports to be used for PUSCH transmission
- SRS request: Indicator indicating whether to transmit aperiodic SRS
- CSI request: Indicator indicating whether and how to report channel state information
- PTRS-DMRS association: Indicator indicating a relationship between an uplink phase-noise tracking reference signal (PTRS) antenna port and a demodulation reference signal (DMRS) antenna port
- DMRS sequence initialization: Indicator for a DMRS sequence initialization value during OFDM-based uplink transmission
- UL-SCH indicator: Indicator indicating whether or not an uplink shared channel (UL-SCH) is included in a PUSCH (a PUSCH that does not include a UL-SCH needs to include CSI)
- Open-loop power control parameter set indication: Indicator indicating a set of open-loop power control (OPLC) parameter set
- Priority indicator: Uplink transmission priority indicator.
- Invalid symbol pattern indicator: Indicator indicating whether to apply an invalid symbol pattern configured by a higher layer As another example, a CRC of the DCI format 1_1 may be scrambled with a C-RNTI, CS-RNTI, or MCS-C-RNTI, and the DCI format 1_1 may include at least one of the following information.
- Identifier for DCI format (1 bit): Indicator indicating a DL DCI format, which is always set to 1 in the case of DCI format 1_1
- Carrier indicator (0 or 3 bits): Indicator indicating a CC scheduled by the corresponding DCI
- Bandwidth part indicator (0, 1, or 2 bits): Indicator indicating a BWP to be activated among downlink BWPs configured for the terminal
- Frequency domain resource assignment: Indicator for allocating a frequency domain resource
- Time domain resource assignment: Indicator for allocating a time domain resource
- PRB bundling size indicator: Indicator indicating a type (i.e., static or dynamic) and a size of PRB bundling
- Rate matching indicator: Indicator indicating a rate matching pattern configured by a higher layer
- ZP CSI-RS trigger: Indicator for applying aperiodic zero-power (ZP) CSI-RS
- 'modulation and coding scheme', 'new data indicator', and 'redundancy version' fields for a transport block 1
- 'modulation and coding scheme', 'new data indicator', and 'redundancy version' fields for a transport block 2
- HARQ process number: Indicator indicating a HARQ process to be allocated to scheduled data
- Downlink assignment index: DAI indicator for HARQ-ACK codebook generation in TDD operation.
- TPC command for a scheduled PUCCH: Power control indicator for PUCCH transmission.
- PUCCH resource indicator: Indicator indicating a PUCCH resource for transmitting HARQ-ACK information for an allocated PDSCH or a predetermined PDSCH set
- PDSCH-to-HARQ_feedback timing indicator: Indicator indicating a time axis offset between the allocated PDSCH and the PUCCH
- Antenna port(s): Indicator indicating antenna ports to be used for PDSCH transmission/reception
- Transmission configuration indication: Indicator indicating transmission configuration information (TCI) to be used for PDSCH transmission and reception
- SRS request: Indicator indicating whether to transmit aperiodic SRS
- DMRS sequence initialization: Indicator for a DMRS sequence initialization value used for PDSCH transmission and reception
- Priority indicator: PDSCH reception priority indicator As another example, certain DCI formats may be used to deliver the same control information to one or more terminals. For example, a CRC of the DCI format 2_3 may be scrambled with a transmit power control-sounding reference signal-RNTI (TPC-SRS-RNTI), and may include at least one of the following information.
- Block number 1, Block number 2, . . . , Block number B: Indicators indicating resource regions to which the DCI format 2_3 is applied. A starting part of the block is configured by a higher layer parameter startingBitOfFormat2-3 or startingBitOfFormat2-3SUL-v1530.

When a terminal for which a higher layer parameter srs-TPC-PDCCH-Group is set to type A performs uplink transmission without a PUCCH and PUSCH or uplink transmission in which SRS power control is not tied to PUSCH power control, one block is configured by the higher layer, and the following fields are defined for the block.

SRS request (0 or 2 bits): Aperiodic SRS transmission indicator

TPC command number 1, TPC command number 2, . . . , TPC command number N: Indicators indicating uplink power control to be applied to a UL carrier indicated by a higher layer parameter cc-IndexInOneCC-Set.

When a terminal for which a higher layer parameter srs-TPC-PDCCH-Group is set to type B performs uplink transmission without a PUCCH and PUSCH or uplink transmission in which SRS power control is not tied to PUSCH power control, one or more blocks may be configured by the higher layer, and the following fields are defined for each block.

SRS request (0 or 2 bits): Aperiodic SRS transmission indicator.

TPC command (2 bits)

The terminal may receive configuration information of a CORESET #0 and a search space #0, identical or similar to that shown in Table 7.

TABLE 7

```
PDCCH-ConfigSIB1 ::=           SEQUENCE {
    controlResourceSetZero
    searchSpaceZero
}
ControlResourceSetZero    // indicates a configuration value (0~15) of
a CORESET #0 within an initial BWP
SearchSpaceZero           // indicates a configuration value (0~15) of
a search space #0 within an initial BWP
```

The terminal may refer to the following higher layer configurations for cell-specific PDCCH monitoring, identical or similar to those shown in Tables 8 to 9.

TABLE 8

```
PDCCH-ConfigCommon ::=              SEQUENCE {
    controlResourceSetZero // indicates a configuration value (0~15) of a CORESET #0 within an initial BWP
    commonControlResourceSet
            // configure a common CORESET by referring to CORESET configuration
    searchSpaceZero    // indicates a configuration value (0~15) of a search space #0 within an initial BWP
    commonSearchSpaceList    // configures a search sapce to be used for cell-specific PDCCH monitoring
by referring to up to four search space configurations
    searchSpaceSIB1    // search space configuration for SIB1
    searchSpaceOtherSystemInformation      // search space configuration for SIB2 or other SIBs
    pagingSearchSpace                      // search space configuration for paging
    ra-SearchSpace                         // search space configuration for random access procedure
    ...
}
ControlResourceSet ::=              SEQUENCE {
    controlResourceSetId          // CORESET ID (a value other than 0 is used)
    frequencyDomainResources      // configuration of frequency resources of a CORESET
    duration                      // configuration of a time-axis length (symbols) of a CORESET
    cce-REG-MappingType           CHOICE { // CCE-to-REG mapping configuration
        interleaved                   SEQUENCE {
            reg-BundleSize
            interleaverSize
            shiftIndex
        },
        nonInterleaved
    },
    precoderGranularity
    tci-StatesPDCCH-ToAddList
            // indicates a QCL relation possible between a QCL reference RS and a PDCCH DMRS
    tci-StatesPDCCH-ToReleaseList
    tci-PresentInDCI         // indicates whether a TCI field exists within the DCI format 1_1
    pdcch-DMRS-ScramblingID  // indicates a scrambling initialization value of a PDCCH DMRS
    ...
}
```

TABLE 9

```
SearchSpace ::=                          SEQUENCE {
    searchSpaceId              // search space ID
    controlResourceSetId       // CORESET ID associated with the search space
    monitoringSlotPeriodicityAndOffset       CHOICE { // periodicity and offset of a PDCCH monitoring slot
        sl1      // performs PDCCH monitoring in every slot
        ...
            // (omitted) monitoring offset values when a PDCCH monitoring periodicity is one of 2
to 1280 slots
        sl2560     // a monitoring offset value when a PDCCH monitoring periodicity is 2560 slots
    }
    duration    // the number of slots where a search space exists for each occasion
    ↑
    monitoringSymbolsWithinSlot
        // a position of a first symbol on which monitoring is to be performed within a PDCCH monitoring
slot
        nrofCandidates                          SEQUENCE {
```

TABLE 9-continued

```
        aggregationLevel1        // The number of PDCCH candidates in case of aggregation level 1
        aggregationLevel2        // The number of PDCCH candidates in case of aggregation level 2
        aggregationLevel4        // The number of PDCCH candidates in case of aggregation level 4
        aggregationLevel8        // The number of PDCCH candidates in case of aggregation level 8
        aggregationLevel16       // The number of PDCCH candidates in case of aggregation level 16
    }
    searchSpaceType                          CHOICE { // indicates a search space type (common or
UE-specific) and DCI formats
        common                               SEQUENCE {
            dci-Format0-0-AndFormat1-0       SEQUENCE {
            ...
            }
            dci-Format2-0                    SEQUENCE {
                nrofCandidates-SFI           SEQUENCE {
                ...
            },
            ...
        }
        dci-Format2-1
        dci-Format2-2
        dci-Format2-3                        SEQUENCE {
            dummy1
            dummy2
            }
        },
        ue-Specific                          SEQUENCE {
            dci-Formats
            ...,
        }
    }
}
```

The terminal may refer to the following higher layer configurations for UE-specific PDCCH monitoring, identical or similar to those shown in Table 10.

TABLE 10

```
PDCCH-Config ::=               SEQUENCE {
    controlResourceSetToAddModList
        // At most three CORESETs are configured by referring to
CORESET configuration
    controlResourceSetToReleaseList
    searchSpacesToAddModList
        // At most ten search spaces are configured by referring to search
space configuration
    searchSpacesToReleaseList
    downlinkPreemption       // downlink preemption indicator
    tpc-PUSCH                // configuraion of reception of a group TPC
for PUSCH transmission
    tpc-PUCCH                // configuration of reception of a group TPC
for PUCCH transmission
    tpc-SRS                  // configuration of reception of a group TPC
for SRS transmission
    ...,
}
```

The presence of one antenna port may mean a case in which a channel experienced by a symbol transmitted through the corresponding antenna port can be estimated or inferred from a channel experienced by another symbol transmitted through the same antenna port.

"Two different antenna ports are quasi co-located (QCLed)" may mean a case in which large-scale characteristics of a channel experienced by a symbol transmitted through one antenna port can be estimated or inferred from a channel experienced by a symbol transmitted through another antenna port. The large-scale characteristics of the channel may mean at least one of 'delay spread', 'Doppler spread', 'Doppler shift', 'average gain', 'average delay', and 'spatial Rx parameters'.

When time/frequency resources of a certain signal (e.g., QCL target RS) are insufficient and large-scale characteristics of a channel cannot be accurately measured with only the corresponding signal, information (i.e., QCL information) on another signal (e.g., QCL reference RS having sufficient time/frequency resources) having large-scale characteristics that can be reused for reception of the corresponding signal (i.e., QCL target RS) may be provided to the terminal to improve the channel measurement performance of the terminal. The NR communication system may support various QCL types as follows.

QCL-Type A: including {Doppler shift, Doppler spread, average delay, delay spread }.
QCL-Type B: including {Doppler shift, Doppler spread}
QCL-Type C: including {Doppler shift, average delay}
QCL-Type D: including {Spatial Rx parameters}

Figure 9:
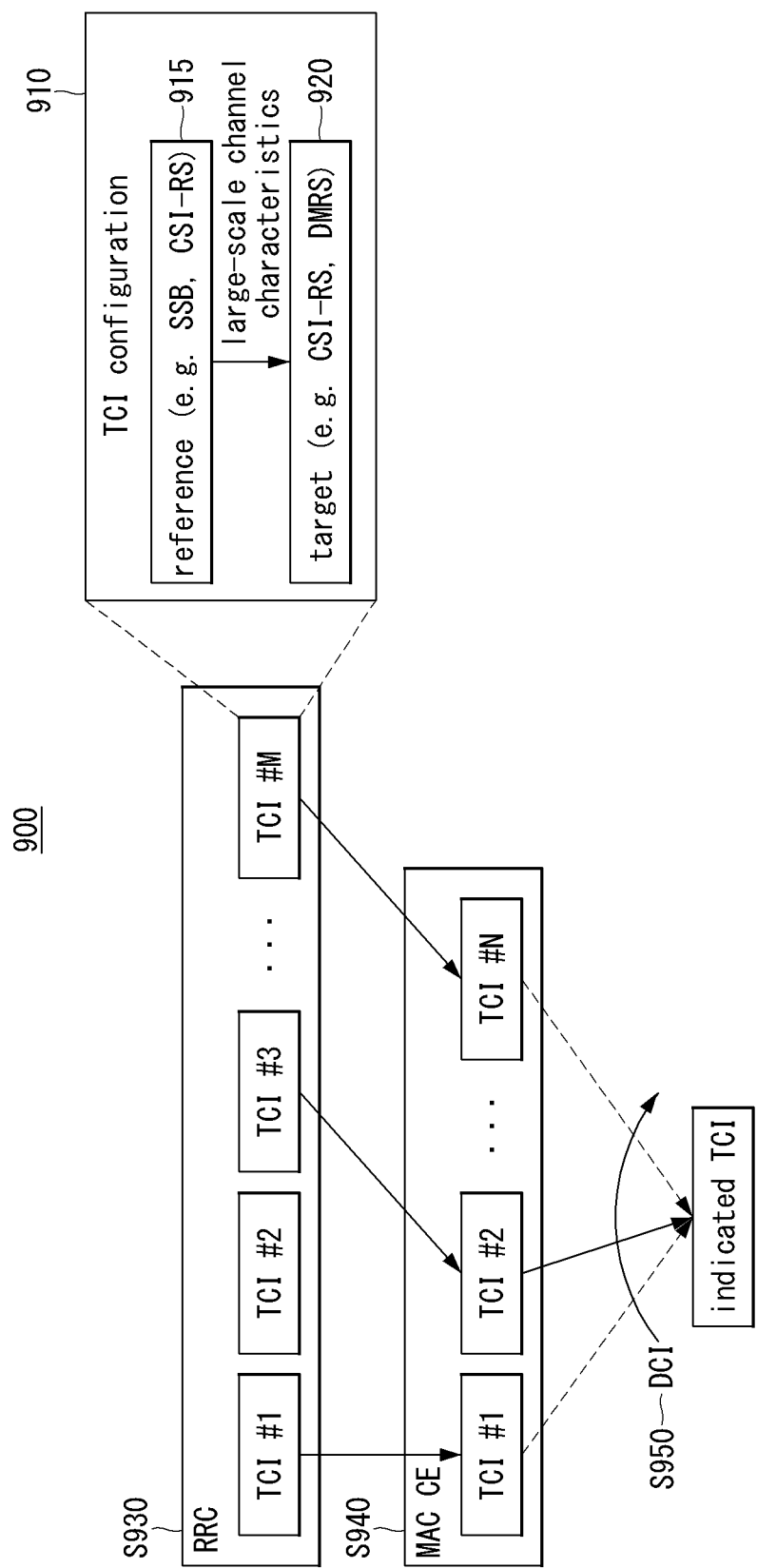
FIG. 9 is a conceptual diagram illustrating an exemplary embodiment of a QCL information transfer process through TCI state configuration and indication in a communication system.

FIG. 9 is a conceptual diagram illustrating an exemplary embodiment of a QCL information transfer process through TCI state configuration and indication in a communication system.

Referring to FIG. 9, in a process of transmitting QCL information through TCI state configuration and indication in a communication system 900, a base station may configure at most M TCI states to a terminal through higher layer (i.e., RRC) signaling, in accordance with a UE capability report and a maximum value (e.g., 4, 8, 64, or 128 depending on a frequency band) defined in a technical specification (S930). In this case, each TCI state configuration 910 may include information on a signal or channel (i.e., QCL reference 915) that provides large-scale channel characteristics to a signal or channel (i.e., QCL target 920) referring to the TCI. One TCI state configuration 910 may include up to two references (i.e., qcl-Type1 and qcl-Type2), the first reference may be one of the QCL-Type A, QCL-Type B, and QCL-type C (i.e., qcl-type1∈{QCL-type A, QCL-type B, QCL-type C}), and the second reference may be the QCL-type D if present (i.e., qcl-type 2=QCL-type D).

Allowing the base station to apply all the TCIs configured through the RRC signaling in real time may greatly increase implementation complexity of the terminal, the base station may transmit an activation message for some of the TCIs configured through the RRC signaling to the terminal through L2 signaling such as a MAC CE (S940). The base station may activate a maximum of N (<M) TCIs, and the terminal may receive a dynamic indication only for the activated TCI.

Thereafter, the base station may dynamically indicate to the terminal some of the activated N TCIs through L1 signaling such as a DCI (S950). The terminal may apply QCL information indicated by the corresponding TCI at a predetermined timing after receiving the L1 signaling, and may perform a reception operation for the signal or channel.

The TCI state indication steps including the 'RRC signaling (S930)', 'MAC CE signaling (S940)', and 'DCI signaling (S950)' of FIG. 9 may be partially omitted depending on a type of the QCL target RS. For example, when the QCL target is a PDSCH DMRS, and one or more TCI states are configured through RRC signaling, the base station may indicate the TCI state using all the steps of FIG. 9. However, when the QCL target is a PDSCH DMRS, and a single TCI state is configured through RRC signaling, the MAC CE signaling (S940) and the DCI signaling step (S950) may be omitted. Similarly, when the QCL target is a PDCCH DMRS, the DCI signaling step S940 may be omitted. Specifically, the terminal may obtain configuration information for the TCI states and QCL information with reference to the RRC signaling identical or similar to those shown in Table 11.

TABLE 11

```
TCI-State ::=           SEQUENCE { // TCI configuration
(I.1-00)
  tci-StateId     // TCI state ID
  qcl-Type1       // first QCL reference configured by referring to QCL
information
  qcl-Type2       // second QCL reference configured by referring to
QCL information
  ...
}
QCL-Info ::=            SEQUENCE {
  cell            // index of a cell in which QCL reference is
transmitted
  bwp-Id          // index of a BWP in which QCL reference is
transmitted
  referenceSignal         CHOICE {
    csi-rs        // index of a CSI-RS to be referred when QCL
reference is a CSI-RS
    ssb           // index of an SSB to be referred when QCL
reference is an SSB
  },
  qcl-Type
        // QCL type to be applied to a QCL target (one of QCL-type A,
QCL-
type B, QCL-type C, and QCL-type D)
  ...
}
```

The base station may instruct the terminal to activate or deactivate some of the TCI states configured by the RRC signaling through MAC CE signaling, or may instruct the terminal to apply a TCI state indicated by a MAC CE to the QCL target RS. For example, the base station may use the following MAC CE signaling according to the type of the QCL target RS.

TCI state activation/deactivation MAC CE for a UE-specific PDSCH DMRS
TCI state indication MAC CE for a UE-specific PDCCH DMRS
TCI state activation/deactivation MAC CE for an enhanced UE-specific PDSCH DMRS FIG. 10 is a conceptual diagram illustrating an exemplary embodiment of a TCI state activation/deactivation MAC CE in a communication system.

Referring to FIG. 10, a first octet (Oct 1) in a TCI state activation/deactivation MAC CE for a UE-specific PDSCH DMRS may include a COREST pool ID field 1010, a serving cell ID field 1020, and a BWP ID field 1030, and a second octet (Oct 2) to an N-th octet (Oct N) may include $T_i$ fields 1040 indicating TCI state IDs i. The detailed meaning of each field may be as follows, and the sizes thereof may be variable.

Serving cell ID: a serving cell ID to which the MAC CE is applied

BWP ID: BWP ID to which the MAC CE is applied, which indicates a BWP in association with a BWP indication field within the DCI $T_i$: indicates a TCI state ID i. When this value is set to 0, it may mean that a TCI state whose TCI state ID is i is deactivated, and when this value is set to 1, it may mean that a TCI state whose TCI state ID is i is activated. The TCI states activated by 1 may be sequentially mapped to TCI indication field code points within the DCI.

CORESET pool ID: If a DCI scheduling a PDSCH is monitored in a CORESET that does not include a higher layer parameter coresetPoolIndex, the field may be ignored. If a DCI scheduling a PDSCH is monitored in a CORESET including the higher layer parameter coresetPoolIndex, $T_i$ indication may be applied only when a value of the CORESET pool ID matches a value of coresetPoolIndex of the CORESET.

Figure 11:
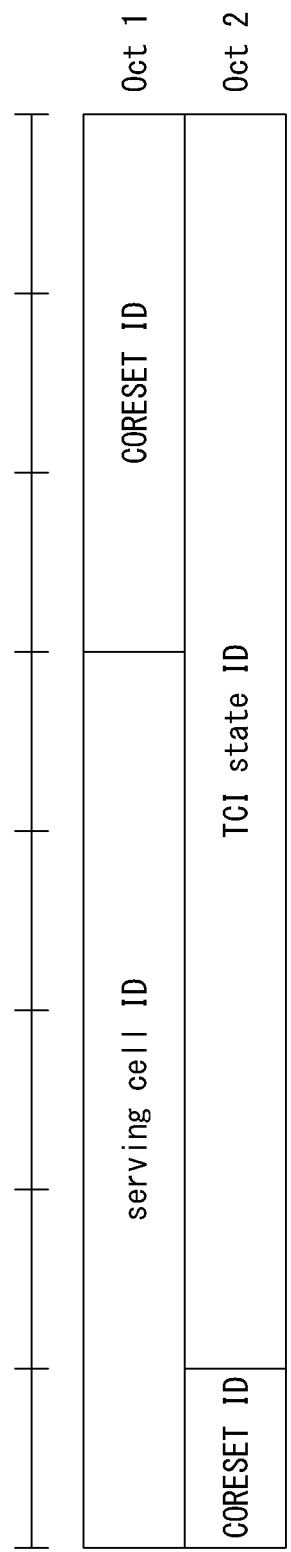
FIG. 11 is a conceptual diagram illustrating an exemplary embodiment of a TCI state indication MAC CE in a communication system.

FIG. 11 is a conceptual diagram illustrating an exemplary embodiment of a TCI state indication MAC CE in a communication system.

Referring to FIG. 11, a first octet (Oct 1) in a TCI state activation/deactivation MAC CE for a UE-specific PDSCH DMRS may include a serving cell ID field 1110 and a CORESET ID field 1120, and a second octet (Oct 2) may include a CORESET ID field 1130 and a TCI state ID field 1140. The sizes thereof may be variable.

Serving cell ID: a serving cell ID to which the corresponding MAC CE is applied.

CORESET ID: indicates a CORESET to which the MAC CE is applied. If this value is set to 0, a CORESET configured through controlResourceSetZero may be a CORESET #0.

TCI state ID: means a TCI state ID indicated by the corresponding MAC CE.

The base station may configure spatial relation information to the terminal through higher layer signaling (e.g., RRC signaling) in order to indicate uplink beam information. The spatial relation information may mean a signaling structure for using spatial domain filters used for transmission and reception of a reference RS for spatial TX filters for uplink transmission of a target RS according to the corresponding spatial relation. The spatial reference RS may be a downlink signal such as SSB or CSI-RS, and may also be an uplink signal such as SRS. If the reference RS is a downlink signal, the terminal may use the spatial RX filter values used for receiving the reference RS as spatial TX filter values for transmitting the target RS according to the spatial relation. If the reference RS is an uplink signal, the terminal may use the spatial TX filter values used for transmitting the reference RS as the spatial TX filter values for transmitting the target RS according to the spatial relation.

The signaling structure for the spatial relation information may vary depending on the type of target RS. For example, when the target RS is an SRS, the base station may perform RRC configuration for each SRS resource based on message identical or similar to those shown in Table 12.

TABLE 12

| | |
|---|---|
| SRS-SpatialRelationInfo ::= | SEQUENCE { |
| servingCellId | // index of a serving cell in which a reference RS is transmitted |
| referenceSignal | CHOICE { |
| ssb-Index | // SSB index when a reference RS is SSB |
| csi-RS-Index | // CSI-RS resource index when a reference RS is CSI-RS |
| srs | SEQUENCE { |
| resourceId | // SRS resource index when a reference RS is SRS |
| uplinkBWP | // index of a UL BWP in which SRS is transmitted when a reference RS is SRS |
| } | |
| } | |
| } | |

For example, when the target RS is an SRS, the base station may perform RRC configuration for each SRS resource, identical or similar to those shown in Table 13.

TABLE 13

| | |
|---|---|
| PUCCH-SpatialRelationInfo ::= | SEQUENCE { |
| pucch-SpatialRelationInfoId | // spatial relation information ID for PUCCH |
| servingCellId | // index of a serving cell in which a reference RS is transmitted |
| referenceSignal | CHOICE { |
| ssb-Index | // SSB index when a reference RS is SSB |
| csi-RS-Index | // CSI-RS resource index when a reference RS is CSI-RS |
| srs | // specifiy a SRS resource by referring to PUCCH-SRS configuration |
| }, | |
| pucch-PathlossReferenceRS-Id | // index of a RS resource to be used for measurement of a pathloss of a PUCCH |
| p0-PUCCH-Id | // index of confuring p0 for PUCCH power control |
| closedLoopIndex | // configuration value of closed-loop power control |
| } | |
| PUCCH-SRS ::= SEQUENCE { | |
| resource | // SRS resource index |
| uplinkBWP | // index of a BWP in which SRS is transmitted |
| } | |

In the 5G NR communication system, a slot format may include downlink symbol(s), uplink symbol(s), and/or flexible symbol(s).

Figure 12:
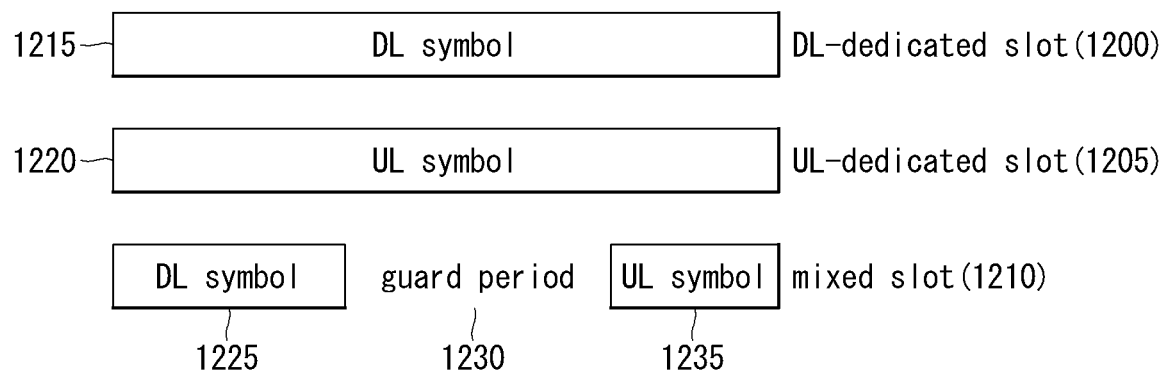
FIG. 12 is a conceptual diagram illustrating slot configurations according to slot formats in a communication system.

FIG. 12 is a conceptual diagram illustrating slot configurations according to slot formats in a communication system.

Referring to FIG. 12, in slot configurations according to slot formats in a communication system, a downlink dedicated slot 1200 may be a slot in which all symbols within the slot are configured only as downlink symbols 1215 according to a slot format. As another example, an uplink dedicated slot 1205 may be a slot in which all symbols within the slot are configured only as uplink symbols 1220 according to a slot format. As another example, in a downlink/uplink mixed slot 1210, some symbols within the slot may be configured as downlink symbols 1225, and some symbols within the slot may be configured as uplink symbols 1235 according to a slot format. In this case, specific symbols of the mixed slot 1210 including both the uplink and downlink symbols may be configured or indicated as a guard period 1230 for downlink-uplink switching, and the terminal may not perform transmission/reception during the guard period 1230.

In the 5G NR communication system, the base station may configure a 'slot format' over one or more slots for each serving cell to the terminal through a higher layer parameter tdd-UL-DL-ConfigurationCommon. In this case, the higher layer parameter tdd-UL-DL-ConfigurationCommon may include or refer to at least one of the following information.

Reference subcarrier spacing: reference numerology $\mu_{ref}$
Pattern 1: A first pattern.
Pattern 2: A second pattern.
Here, the pattern 1 or pattern 2 may include at least one of the following configurations.
Slot configuration periodicity (i.e., dl-UL-Transmission-Periodicity): Slot configuration periodicity P expressed in units of msec
Number of downlink dedicated slots (i.e., nrofDownlinkSlots): The number $d_{slots}$ of slots composed only of downlink symbols
Number of downlink symbols (i.e., nrofDownlinkSymbols): The number $d_{sym}$ of downlink symbols
Number of uplink dedicated slots (i.e., nrofUplinkSlots): The number $u_{slots}$ of slots composed only of uplink symbols
Number of uplink symbols (i.e., nrofUplinkSymbols): The number $u_{sym}$ of uplink symbols The slot configuration periodicity P msec of the first pattern may include $S=P\cdot 2^{\mu_{ref}}$ slots, and in this case, the numerology may follow $\mu_{ref}$. In addition, among the S slots, the first $d_{slots}$ slots may include only downlink symbols, and the last $u_{slots}$ slots may include only uplink symbols. In this case, $d_{sym}$ symbols after first $d_{slots}$ slots may be downlink symbols. In addition, $u_{sym}$ symbols before last $u_{slots}$ slots may be uplink symbols. The remaining symbols (i.e., $(S-d_{slots}-u_{slots})\cdot N_{symb}^{slot}-d_{sym}-u_{sym}$ symbols) that are not designated as downlink symbols or uplink symbols in the pattern may be flexible symbols.

If the second pattern is configured and the slot configuration periodicity of the second pattern is $P_2$, a slot configuration periodicity $P+P_2$ msec configured with a combination of the first pattern and the second pattern may include first $S=P\cdot 2^{\mu_{ref}}$ slots and second $S_2=P_2\cdot 2^{\mu_{ref}}$ slots. In this case, the positions and numbers of downlink symbols, uplink symbols, and flexible symbols in the second pattern may be configured with reference to the description of the first pattern based on configuration information of the second pattern. In addition, when the second pattern is configured, the terminal may assume that $P+P_2$ is a divisor of 20 msec.

The base station may override direction(s) of 'flexible symbol(s)' among symbols configured through the higher layer parameter tdd-UL-DL-ConfigurationCommon by using the higher layer parameter tdd-UL-DL-Configuration-Dedicated) based on the following information.

Slot configuration set (i.e., slotSpecificConfigurationsToAddModList): A set of slot configurations
Slot index (i.e., slotIndex): An index of a slot included in the set of slot configurations
Symbol directions (i.e., symbols): The directions of the symbols indicated by the slot index (i.e., slotIndex). If all symbol directions are downlink (symbols=allDownlink), all symbols within the corresponding slot are downlink symbols. If all symbol directions are uplink (symbols=allUplink), all symbols within the corresponding slot are uplink symbols. If the symbol directions are explicit (symbols=explicit), nrofDownlinkSymbols may indicate the number of downlink symbols located in the first part of the corresponding slot, and nrofUplinkSymbols may indicate the number of uplink symbols located in the last part of the corresponding slot. If the nrofDownlinkSymbols or the nrofUplinkSymbols is omitted, the corresponding parameter may be regarded as indicating a value of 0. The remaining symbols within the slot become flexible symbols.

In the 5G communication system, the base station may indicate a slot format to the terminal based on L1 signaling. For example, when the terminal receives a higher layer parameter SlotFormatIndicator from the base station, the terminal may obtain configuration information a slot format indication-RNTI (i.e., SFI-RNTI). Meanwhile, when the terminal receives a higher layer parameter dci-PayloadSize from the base station, the terminal may obtain configuration information of a payload size of the DCI format 2_0. In addition, the terminal may additionally receive, from the base station, information on PDCCH candidate(s), CCE aggregation level, and search space set(s) of a CORESET for monitoring the DCI format 2_0. Each slot format indication (SFI) index field in the DCI format 2_0 may indicate a slot format to be applied to each slot in a slot set of a DL BWP and a UL BWP from a slot in which the terminal has detected the corresponding DCI format 2_0. In this case, the size of the slot set may be equal to or greater than a PDCCH monitoring periodicity of the DCI format 2_0. For example, when the slot set is composed of N slots, the DCI format 2_0 may include N SFI index fields, and each SFI index field may indicate a format value of Tables 14 and 15 below. In Tables 14 and 15, 'D' may mean a downlink symbol, 'U' may mean an uplink symbol, and 'F' may mean a flexible symbol.

TABLE 14

| Slot format | Symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |

TABLE 14-continued

| Slot format | Symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |

TABLE 15

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | F | F | U | U | U | U | U | U | U |
| 46 | D | D | D | D | F | U | D | D | D | D | D | F | U | U |
| 47 | D | D | F | U | U | U | D | D | F | U | U | U | U | U |
| 48 | D | F | U | U | U | U | D | F | U | U | U | U | U | U |
| 49 | D | D | D | D | F | U | D | D | D | D | D | F | F | U |
| 50 | D | D | F | F | U | U | D | D | F | F | U | U | U | U |
| 51 | D | F | F | U | U | U | D | F | F | U | U | U | U | U |
| 52 | D | F | F | F | F | U | D | F | F | F | F | F | F | U |
| 53 | D | D | F | F | F | U | D | D | F | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines a slot format of a slot based on a higher layer parameter tdd-UL-DL-ConfigurationCommon or a higher layer parameter tdd-UL-DL-ConfigurationDedicated, and a detected DCI format (when exists). | | | | | | | | | | | | | |

Meanwhile, in general, it may not be possible to force all terminals to implement the same feature. The UE capability report may enable an expensive terminal to implement a large amount of features with high performance, and may enable a low-cost terminal to implement a small amount of features with low performance. The UE capability report may make it possible to secure the degree of freedom in terminal implementation for various situations, and when the capability information is reported to the network, the base station may configure each function within the limits supported by each terminal. Certain functions may be promised to be mandatory for all terminals to implement, and in this case, it may be possible to omit the UE capability report for the mandatory functions.

It may be possible for the terminal to perform UE capability reporting of different values for one function for each frequency band or for each duplex scheme. For example, the terminal may support a specific function for a frequency range 1 (FR1), which means a band below 6 GHz, but may report to the base station that the terminal does not support a specific function for a frequency range 2 (FR2), which means a band above 6 GHz. As another example, the terminal may report to the base station that a specific function is supported in the TDD scheme but not supported in the FDD scheme.

When the terminal performs the UE capability reporting, the base station should follow (should not violate) the content of the UE capability report when perform configuration, indication, or scheduling on the terminal. If the base station indicates, to the terminal, configuration, indication or scheduling contrary to the UE capability report, the terminal may ignore it.

Figure 13:
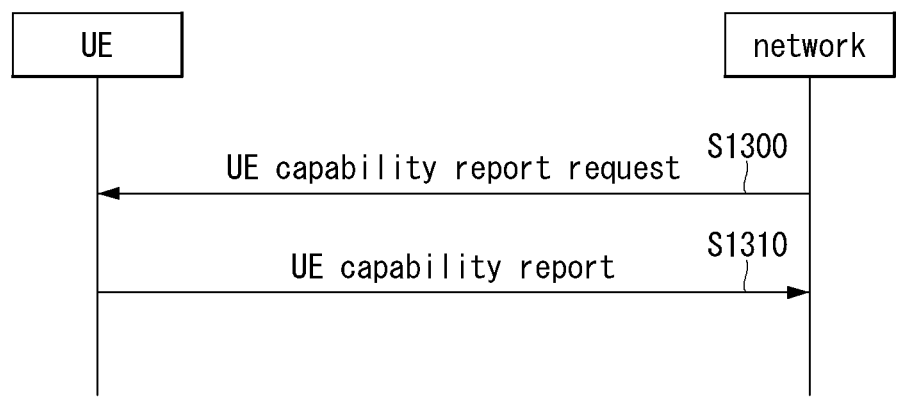
FIG. 13 is a flowchart illustrating an exemplary embodiment of a UE capability reporting procedure in a communication system.

FIG. 13 is a flowchart illustrating an exemplary embodiment of a UE capability reporting procedure in a communication system.

Referring to FIG. 13, in the UE capability reporting procedure, the base station may transmit a UE capability report request signal to the terminal through a higher layer parameter UECapabilityEnquiry when the terminal is in RRC connected mode (i.e., RRC_CONNECTED state) (S1300). In this case, the network may refer to only the UE capability report after access stratum (AS) security activation, and may not retransmit or report the UE capability report before the AS security activation to the core network (CN). Upon receiving the UE capability report request signal, the terminal may compile UE capability information according to a specific procedure, and report it to the base station through a UE capability information signal (e.g., UECapabilityInformation) (S1310).

The specific procedure for compiling the UE capability information signal may include a procedure of generating at least one of a list (i.e., supportedBandCombinationList) of band(s) or band combination(s) (BC(s)) supported by the terminal, feature set (FS) information related to feature sets supported by the terminal, or feature set combination (FSC) information related to feature set combinations supported by the terminal. For example, when the base station requests a UE capability report from the terminal in order to obtain information on band(s) or band combination(s) supported by the terminal, the terminal may report which band(s) it supports for each radio access technology (RAT). To this end, the base station may set a RAT-type in a UE RAT capability report request signal (e.g., UE-CapabilityRAT-Request), which is included in a UE RAT capability report request list signal (e.g., ue-CapabilityRAT-RequestList) that is a higher layer message, to one of 'nr', 'eutra-nr', 'eutra', and 'eutra-fdd'. This may mean that the base station may request a UE capability report for one or more RATs or RAT combinations from the terminal, and in this case, the terminal may respond to each request for a list of support bands for a plurality of RATs or RAT combinations. For example, if the RAT-type is set to 'nr', the terminal may include a list of bands or band combinations to which NR-DC can be applied in the UE capability report. As another example, if the RAT-type is set to 'eutra-nr', the terminal may include a list of bands or band combinations applicable to multi-RAT DC (MR-DC) such as EN-DC, NGEN-DC, NE-DC, or the like in the UE capability report. In addition, when the base station requests a UE capability report, the base station may provide, to the terminal, a list of bands for which the terminal determines whether support is provided, through a higher layer parameter frequencyBandListFilter. For the bands included in the higher layer parameter frequencyBandListFilter, the terminal may determine a candidate band combination by considering 'predetermined RAT types supported for each band', 'information on RAT-types requested by the base station', etc., and may include the candidate band combination in the UE capability report.

Figure 14A:
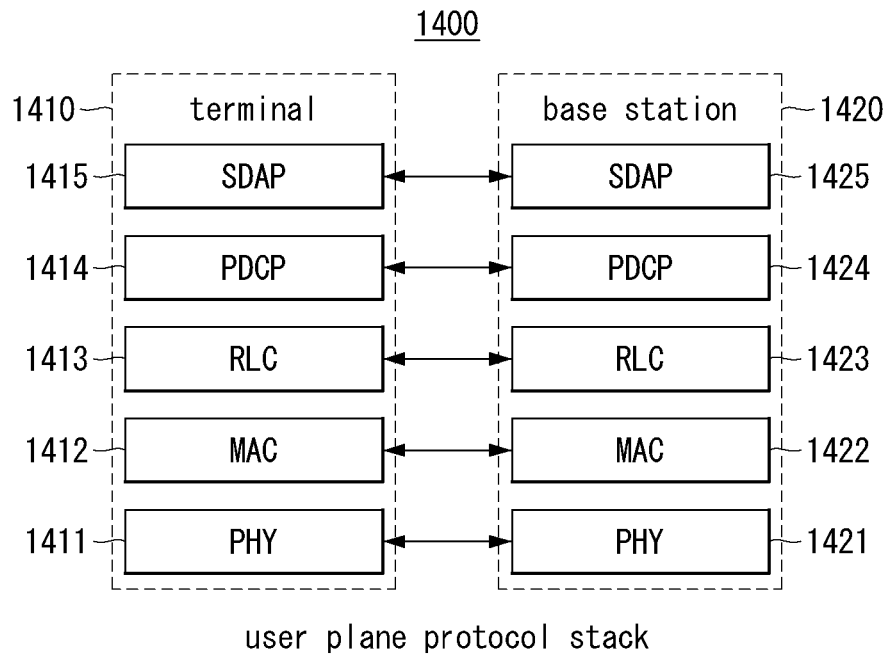
FIG. 14A is a conceptual diagrams for describing a first exemplary embodiment of a user plane protocol stack structure in a communication system.
Figure 14B:
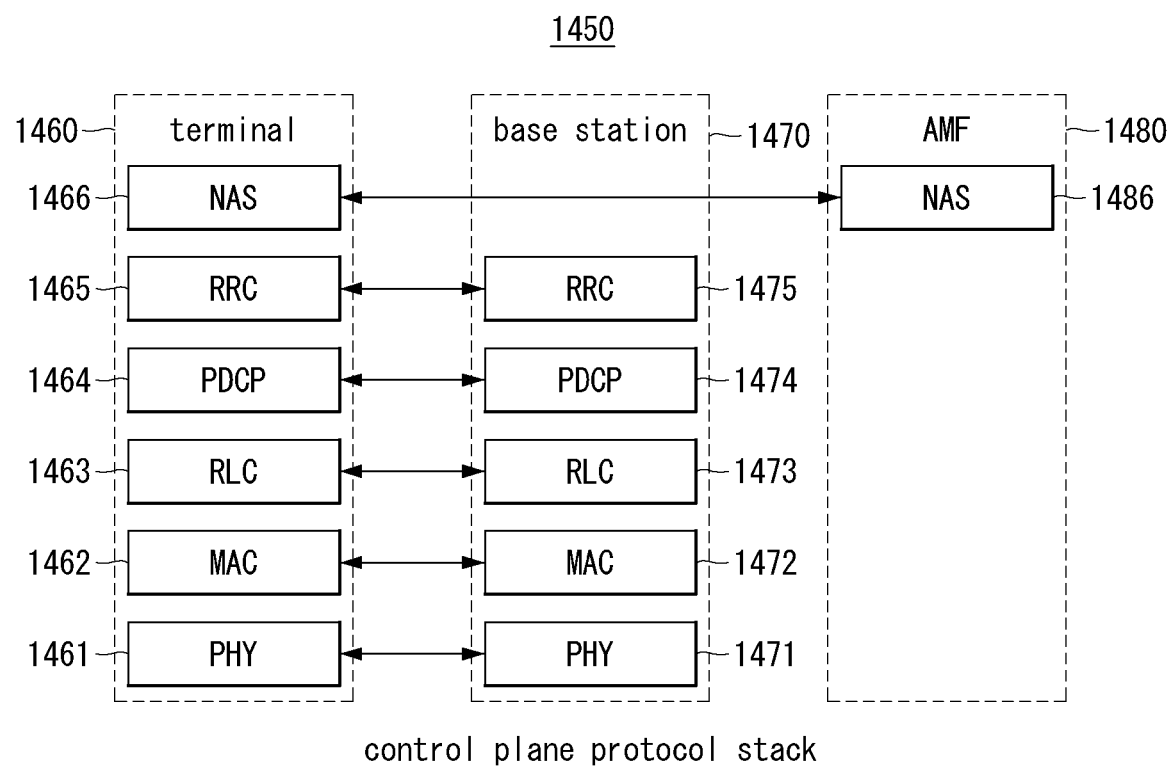
FIG. 14B is a conceptual diagrams for describing a first exemplary embodiment a control plane protocol stack structure in a communication system.

FIG. 14A is a conceptual diagrams for describing a first exemplary embodiment of a user plane protocol stack structure in a communication system, and FIG. 14B is a conceptual diagrams for describing a first exemplary embodiment a control plane protocol stack structure in a communication system.

Referring to FIGS. 14A and 14B, a radio interface protocol stack or radio interface protocol stack structures 1400 and 1450 may be defined in a radio connection section between communication nodes. For example, the radio interface protocol stack may be divided into a physical layer, a data link layer, a network layer, and the like, which are vertically configured.

The radio interface protocol stack may be divided into the user plane protocol stack 1400 and the control plane protocol stack 1450. Here, the control plane may be a plane for transmitting a control signal. The control signal may be referred to as a signaling signal. The user plane may be a plane for transmitting user data.

Referring to FIG. 14A, the communication system may include a terminal 1410 and a base station 1420. The terminal 1410 may be referred to as a user equipment (UE). The base station 1420 may correspond to an eNB, a gNB, or the like. The terminal 1410 and the base station 1420 may perform mutual data signal transmission/reception based on the user plane protocol stack structure 1400 shown in FIG. 14A.

In the user plane radio interface protocol stack structure 1400 of the communication system, the terminal 1410 and the base station 1420 may include PHY layers 1411 and 1421 included in L1, MAC layers 1412 and 1422, RLC layers 1413 and 1423, and packet data convergence protocol (PDCP) layers 1414 and 1424 included in L2, service data adaptation protocol (SDAP) layers 1415 and 1425 included in L3, and the like.

Referring to FIG. 14B, the communication system may include a terminal 1460 and a base station 1470. The terminal 1460 and the base station 1470 may perform mutual control signal transmission/reception based on the control plane protocol stack structure 1450 shown in FIG. 14B.

In the control plane protocol stack structure 1450 of the communication system, the terminal 1460 and the base station 1470 may include PHY layers 1461 and 1471 included in L1, MAC layers 1462 and 1472, RLC layers 1463 and 1473, and PDCP layers 1464 and 1474 included in L2, and RRC layers 1465 and 1475 included in L3, and the like.

The communication system may further include an Access and Management Mobility Function (AMF) 1480. In the control plane protocol stack structure 1450, the terminal 1460 and the AMF 1480 may include non-access stratum (NAS) layers 1466 and 1486. The base station 1470 may not include a NAS layer. In other words, in the control plane protocol stack structure 1450, the NAS layer of the base station 1470 may be transparent.

In the 5G NR communication system, it may be possible to support flexible and dense wireless backhaul links for each cell through the IAB feature, without support of a wired network.

Figure 15:
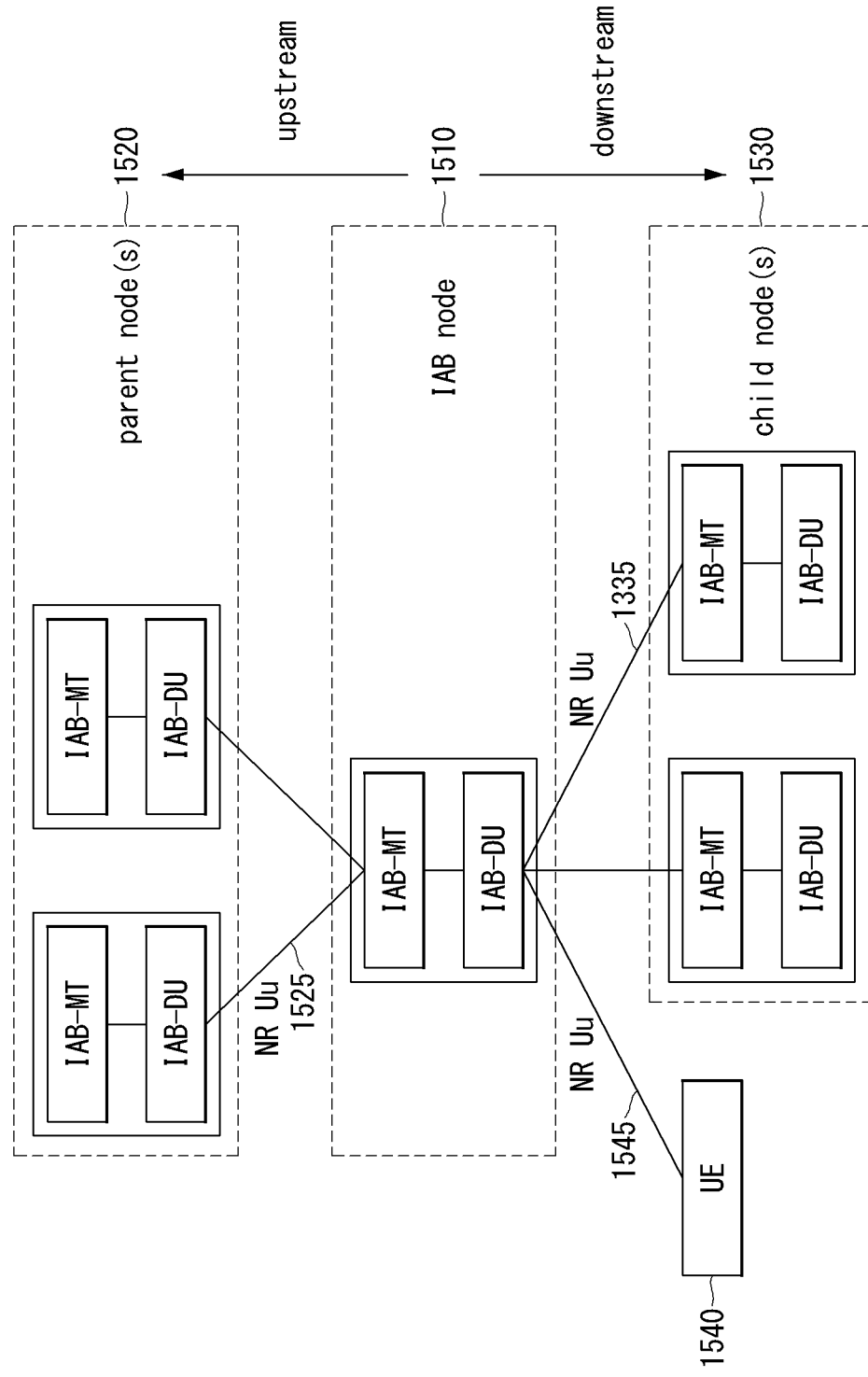
FIG. 15 is a conceptual diagram illustrating an exemplary embodiment of an IAB network in a communication system.

FIG. 15 is a conceptual diagram illustrating an exemplary embodiment of an IAB network in a communication system.

Referring to FIG. 15, a communication system 1500 may include one or more communication nodes. The communication nodes of the communication system 1500 may constitute an IAB network. For example, the communication system 1500 may include one or more IAB nodes. FIG. 15 shows an exemplary embodiment in which one IAB node communicates with one or more upper nodes and one or more lower nodes. However, this is only an example for convenience of description, and exemplary embodiments of the present disclosure are not limited thereto.

The communication system 1500 may include a plurality of IAB nodes. For example, the communication system 1500 may include a first IAB node 1510, one or more parent nodes 1520 corresponding to upper nodes of the first IAB node 1510, and/or one or more child nodes corresponding to lower nodes of the first IAB node 1510. Here, each of the one or more parent nodes 1520 may be referred to as a 'donor node'. The IAB node 1510, the one or more parent nodes 1520, and/or the one or more child nodes 1530 may constitute the IAB network. Each of the IAB nodes 1510, 1520, and 1530 constituting the IAB network may function as a type of repeater configured based on a front-haul structure. In the communication system 1500 to which the IAB network technology is applied, it is possible to support flexible and dense wireless backhaul links for each cell without support of a wired network.

Each of the IAB nodes 1510, 1520, and 1530 may include an IAB-DU and an IAB-MT. The IAB-MT may allow each IAB node to function as a terminal in communication with an upper node. For example, the first IAB node 1510 may communicate with the upper parent nodes 1520 through the IAB-MT. On the other hand, the IAB-DU may allow each IAB node to function as a base station or a cell in communication with a lower node. For example, the first IAB node 1510 may communicate with the lower child nodes 1530 or a terminal 1540 through the IAB-DU.

The IAB-MT of the first IAB node 1510 may be connected to the IAB-DUs of the parent nodes 1520 through Uu interfaces 1525. The IAB-DU of the first IAB node 1510 may be connected to the IAB-MTs of the child nodes 1530 through Uu interfaces 1535. The IAB-DU of the first IAB node 1510 may be connected to a terminal 1340 through a Uu interface 1545.

After the IAB node constituting the IAB network completely decodes a received signal, the IAB node may re-encode the decoded received signal, and amplify and transmit it. The IAB node may be classified as a type of regenerative relay. To this end, the IAB node may support a control plane (CP) and a user plane (UP) from the parent node to the terminal based on a protocol stack structure including the L1 and L2 layers, or higher layers.

The IAB node constituting the IAB network has an advantage of being able to perform various operations including operations as a base station and a terminal. On the other hand, the IAB node has disadvantages in that implementation complexity and production cost are relatively high, and a delay required for retransmission may be relatively large.

Figure 16:
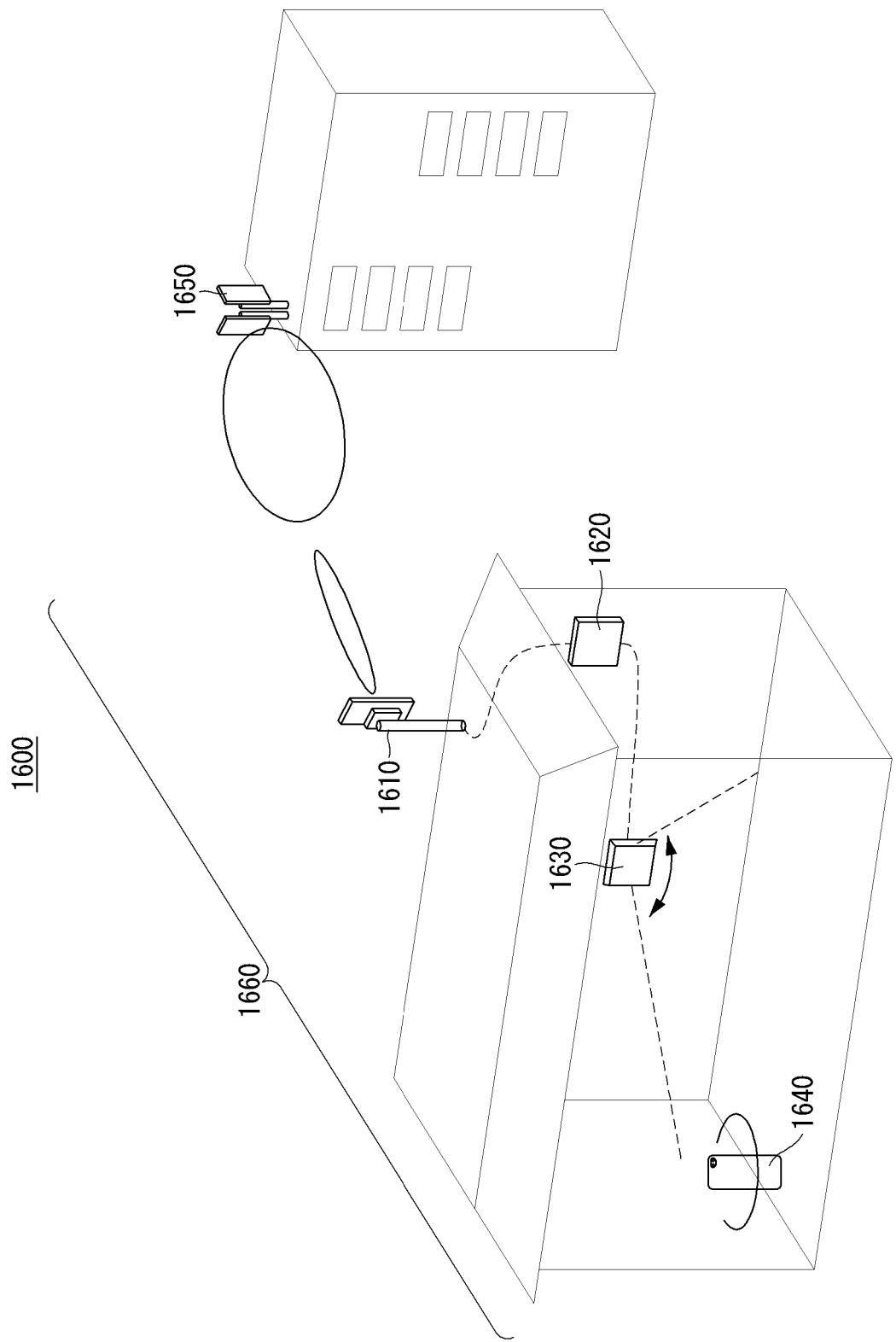
FIG. 16 is a conceptual diagram illustrating a first exemplary embodiment of a signal transmission/reception method based on a wireless repeater in a communication system.

FIG. 16 is a conceptual diagram illustrating a first exemplary embodiment of a signal transmission/reception method based on a wireless repeater in a communication system.

Referring to FIG. 16, a communication system 1600 may include one or more communication nodes. For example, the communication system 1600 may include one or more base stations and one or more terminals. The communication system 1600 may include one or more repeaters that relay communications between one or more communication nodes. FIG. 16 shows an exemplary embodiment in which one repeater relays communications between one base station existing outdoors and one terminal existing indoors. However, this is only an example for convenience of description, and exemplary embodiments of the present disclosure are not limited thereto. For example, an exemplary embodiment of the communication system 1600 may include a plurality of base stations, terminals, and/or repeaters to perform mutual communications.

In an exemplary embodiment of the communication system 1600, a repeater 1620 including an outdoor antenna 1610 may receive and relay a radio signal received in an outdoor space. The repeater 1620 may be classified as a type of non-regenerative repeater that amplifies and retransmits reception signals. When the repeater 1620 further includes an indoor antenna 1630, the repeater 1620 may relay a radio signal received from the outdoor space to an indoor space. Alternatively, the repeater 1620 may relay a radio signal received in the indoor space to the outdoor space. The repeater 1620 may be a radio frequency (RF) repeater mainly used to cover an indoor radio shadow area. The respective elements constituting the repeater 1620 may be interconnected by wire or wirelessly.

The repeater 1620 may relay communications between a terminal 1640 located indoors and a base station 1650 located outdoors through the indoor and outdoor antennas 1610 and 1630. For example, the repeater 1620 may receive a downlink signal transmitted from the base station 1650 through the outdoor antenna 1610. The repeater 1620 may amplify the received signal and transmit it to the terminal 1640 in the indoor space through the indoor antenna 1630. On the other hand, the repeater 1620 may receive an uplink signal transmitted from the terminal 1640 through the indoor antenna 1630. The repeater 1620 may amplify the received signal and transmit it to the base station 1650 through the outdoor antenna 1610. The outdoor antenna 1610 may be referred to as a 'first antenna', and the indoor antenna 1320 may be referred to as a 'second antenna'. Hereinafter, configurations related to an operation in which the repeater 1620 relays a downlink signal will be described as an example. However, this is only an example for convenience of description, and exemplary embodiments of the present disclosure are not limited thereto. For example, exemplary embodiments of the present disclosure may be equally or similarly applied to an operation of the repeater 1620 relays an uplink signal.

Commercial RF repeaters are generally capable of operating in the FR1 band. In the FR1 band, the base station 1650 may perform communications through one beam per one cell or one sector. Here, the base station 1650 may correspond to an eNodeB (eNB) or a gNodeB (gNB). The outdoor antenna 1660 provided for communications with the base station 1650 may be a directional antenna. For example, the outdoor antenna 1660 may be a directional log-periodic dipole array (LPDA) type antenna. The outdoor antenna 1610 may be installed to face the direction of the base station. The indoor antenna 1630 provided for communications with the terminal 1640 may be a patch antenna. For example, the indoor antenna 1630 may be configured as a patch antenna having an effective coverage of about 70 degrees to 75 degrees. The indoor antenna 1630 may support communications with the terminal 1640 operating in an omni-directional beam scheme or an omni-beam scheme.

The base station 1650 may recognize all beams on a communication path from the base station 1650 to the terminal 1640 through the repeater 1620 as one 'single virtual TX beam'. On the other hand, the base station 1650 may recognize all beams on a communication path from the terminal 1640 to the base station 1650 through the repeater 1620 as one 'single virtual RX Beam'.

Figure 17:
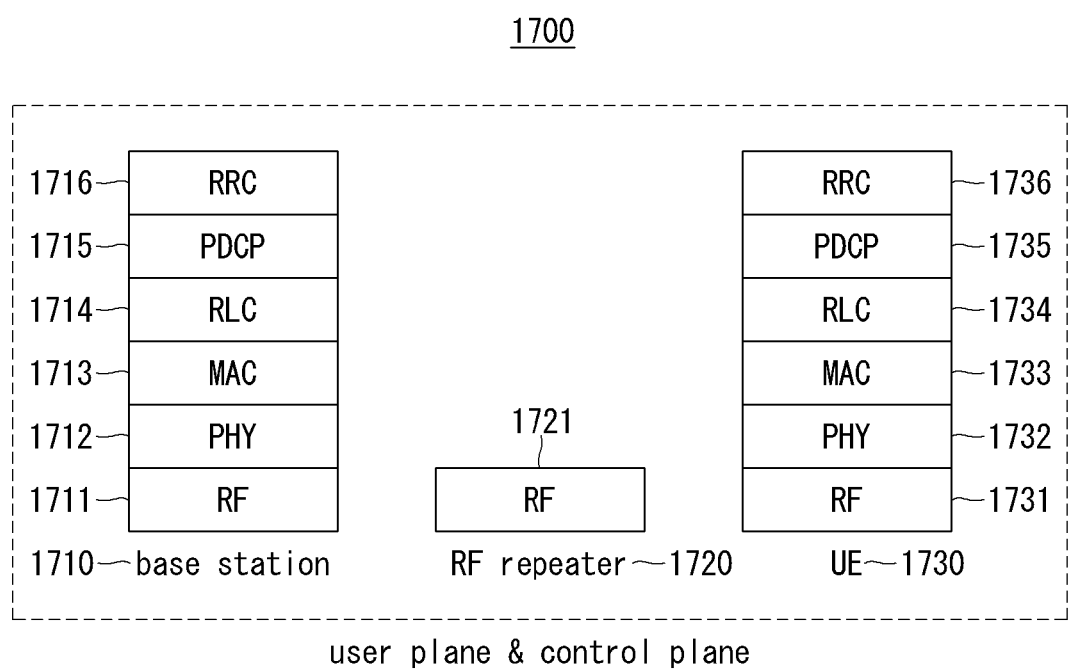
FIG. 17 is a conceptual diagram illustrating a first exemplary embodiment of a user plane and a control plane in a communication system including a wireless repeater.

FIG. 17 is a conceptual diagram illustrating a first exemplary embodiment of a user plane and a control plane in a communication system including a wireless repeater.

Referring to FIG. 17, in a radio connection section between communication nodes, a radio interface protocol or a radio interface protocol stack structure 1700 may be defined. For example, the radio interface protocol may be divided into a physical layer, a data link layer, a network layer, and the like which are vertically configured.

The radio interface protocol may be divided into a user plane and a control plane. Here, the control plane may be a plane for control signal transmission. The control signal may be referred to as a signaling signal. The user plane may be a plane for user data transmission.

In an exemplary embodiment of the communication system, the communication system may include a base station 1710 and a terminal 1730. For example, the base station 1710 may correspond to an eNB, a gNB, or the like. The terminal 1730 may be referred to as a 'user equipment (UE)'. The communication system may include a repeater 1720 that relays wireless communications between the base station 1710 and the terminal 1730. The repeater 1720 may correspond to an RF repeater. The base station 1710, the repeater 1720, and the terminal 1730 of the communication system may be the same as or similar to the base station 1650, the repeater 1620, and the terminal 1640 described with reference to FIG. 16, respectively.

In the user plane of the radio interface protocol stack structure 1700 of the communication system, the base station 1710 and the terminal 1730 may include PHY layers 1712 and 1732 included in a layer 1 (L1), MAC layers 1713 and 1733 included in a layer 2 (L2), radio link control (RLC) layers 1714 and 1734, packet data convergence protocol (PDCP) layers 1715 and 1735, and the like, respectively. On the other hand, in the control plane of the protocol stack structure 1700, the base station 1710 and the terminal 1730 may include PHY layers 1712 and 1732 included in a L1, MAC layers 1713 and 1733 included in a L2, RLC layers 1714 and 1734, PDCP layers 1715 and 1735, RRC layers 1716 and 1736 included in a layer 3 (L3), and the like, respectively. The base station 1710 and the terminal 1730 may perform radio signal transmission/reception through RF functions 1711 and 1731.

Meanwhile, in the user plane and the control plane of the protocol stack structure 1700, the RF repeater 1720 may not include the layers such as the PHY layer to the RRC layer, may receive and amplify signals transmitted from the base station 1710 and the terminal 1730 based on the RF function 1721, and may transmit or retransmit the amplified signals. In other words, in the user plane and the control plane of the protocol stack structure 1700, the layers such as the PHY layer to the RRC layer of the repeater 1720 may be transparent, and the radio signal received at the repeater may be amplified, transmitted, and/or retransmitted in terms of the RF function 1721.

In exemplary embodiments of a repeater, such as the repeater 1620 described with reference to FIG. 16 and the repeater 1720 described with reference to FIG. 17, the repeater may repeatedly perform reception, amplification, transmission and/or retransmission operations for the RF signal simply based on the RF function, an RF signal. In this case, the complexity and cost of implementing the repeater and the communication system including the repeater may be low.

Meanwhile, in exemplary embodiments of a repeater such as the repeater 1620 described with reference to FIG. 16 and the repeater 1720 described with reference to FIG. 17, the base station and the communication network may not be able to secure control over the repeater. In this case, the performance of the repeater may be limited in the FR2 band requiring multi-beam operations. For example, in order to improve signal quality in the FR2 band and to control the amount of interference on a communication path, explicit or implicit management and indication operations for the repeater beams may be required. However, for a repeater including only a simple RF function, explicit or implicit management and indication operations for the repeater beams may not be performed. A technique for improving the performance of the repeater in the FR2 band requiring multi-beam operations may be required.

In exemplary embodiments of the repeater such as the repeater 1620 described with reference to FIG. 16 and the repeater 1720 described with reference to FIG. 17, the repeater may have limited performance in a TDD frequency band (e.g., 3.5 GHz band or FR2) requiring sophisticated DL/UL switching or a FR2 band requiring multi-beam operations. In the 5G system, a transmission direction for a slot or symbol may be dynamically indicated according to a slot format configuration or indication transmitted through L1 signaling. Alternatively, a beam, TCI, or QCL for each channel may be dynamically indicated. However, since the RF repeater does not decode signals transmitted by the base station, it may be difficult to recognize the above-mentioned indications. In this reason, a repeater technology capable of decoding some or all of the signals transmitted by the base station may be required.

Figure 18A:
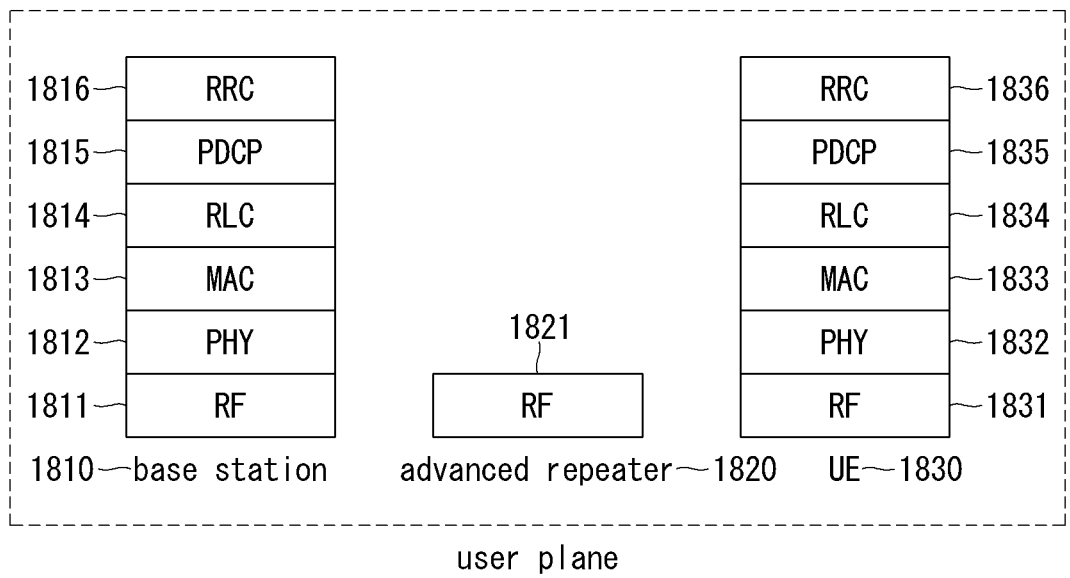
FIG. 18A is a conceptual diagram illustrating a second exemplary embodiment of a user plane in a communication system including a wireless repeater.
Figure 18B:
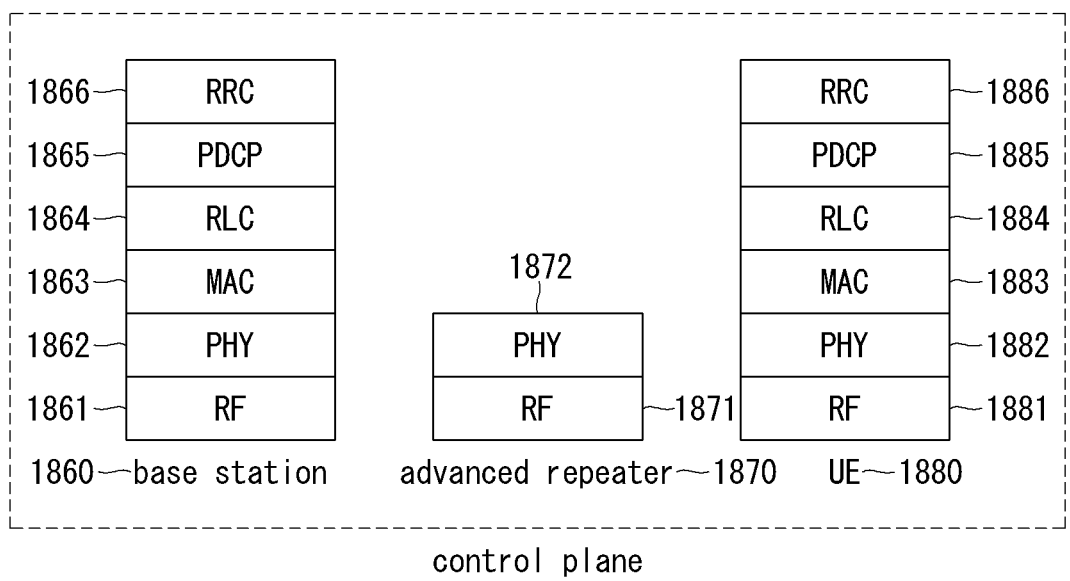
FIG. 18B is a conceptual diagram illustrating a second exemplary embodiment of a control plane in a communication system including a wireless repeater.

FIG. 18A is a conceptual diagram illustrating a second exemplary embodiment of a user plane in a communication system including a wireless repeater, and FIG. 18B is a conceptual diagram illustrating a second exemplary embodiment of a control plane in a communication system including a wireless repeater.

Referring to FIGS. 18A and 18B, in a radio connection section between communication nodes, a radio interface protocol or a radio interface protocol stack structure 1800 or 1850 may be defined. The radio interface protocol may be divided into a user plane and a control plane. Hereinafter, in describing the second exemplary embodiment of the user plane and the control plane in the communication system with reference to FIGS. 18A and 18B, the content overlapping with those described with reference to FIGS. 1 to 17 may be omitted.

In an exemplary embodiment of the communication system, the communication system may include base stations 1810 and 1860 and terminals 1830 and 1880. The communication system may include repeaters 1820 and 1870 that relay wireless communications between the base stations 1810 and 1860 and the terminals 1830 and 1880. Here, the repeaters 1820 and 1870 may be repeaters having advanced or enhanced functions than the repeater 1620 described with reference to FIG. 16. Alternatively, the repeaters 1820 and 1870 may be lower-cost repeaters than the IAB nodes 1610, 1620, and 1630 described with reference to FIG. 15. The repeaters 1820 and 1870 described with reference to FIG. 18 may be referred to as 'advanced repeaters'.

Referring to FIG. 18A, in the user plane 1800 of the radio interface protocol stack structure of the communication system, the base station 1810 and the terminal 1830 may include PHY layers 1812 and 1832, MAC layers 1813 and 1833, RLC layers 1814 and 1834, PDCP layers 1815 and 1835, and the like, respectively. In an exemplary embodiment of the communication system, in the user plane 1800 of the radio interface protocol stack structure of the communication system, the base station 1810 and the terminal 1830 may further include RRC layers (not shown). The base station 1810 and the terminal 1830 may perform radio signal transmission/reception through RF functions 1811 and 1831, respectively. In the user plane 1800 of the protocol stack structure, the repeater 1820 may not include the layers such as the PHY layer to the PDCP layer, and may receive and amplify signals transmitted from the base station 1810 and the terminal 1830 based on the RF function 1821, and may transmit or retransmit the amplified signals. In the user plane 1800 of the protocol stack structure, the layers such as the PHY layer to the RRC layer of the repeater 1820 may be transparent, and the radio signals received by the repeater 1820 may be amplified, transmitted, and/or retransmitted in terms of the RF function 1821.

On the other hand, referring to FIG. 18B, in the control plane 1850 of the protocol stack structure, the base station 1860 and the terminal 1880 may include PHY layers 1862 and 1882, MAC layers 1863 and 1883, RLC layers 1864 and

1884, PDCP layers 1865 and 1885, RRC layers 1866 and 1886, and the like, respectively. The base station 1860 and the terminal 1880 may perform radio signal transmission/reception through RF functions 1861 and 1881, respectively. In the control plane 1850 of the protocol stack structure, the repeater 1870 may further include a PHY layer 1872 in addition to an RF function 1871. The PHY layer 1872 of the repeater 1870 corresponding to an advanced repeater may be used for management operations of the base station 1860 for the repeater 1870. For example, the PHY layer 1872 of the repeater 1870 may process information for reporting capability of the repeater 1870. The PHY layer 1872 of the repeater 1870 may process information for management and indication of the base station 1860 for beams of the repeater 1870. The PHY layer 1872 of the repeater 1870 may process information for management and indication of the base station 1860 on a slot format of the repeater 1870. When the repeater 1870 performs an operation based on the PHY layer 1872 rather than simply performing an operation based on the RF function 1871 in the control plane 1850 of the protocol stack structure, the base station 1860 may control a beam or a combination of beams in the link between the base station 1860 and the repeater 1870 and/or the link between the repeater 1870 and the terminal 1880. Also, the base station 1860 may control slot format(s) in the link between the base station 1860 and the repeater 1870 and/or the link between the repeater 1870 and the terminal 1880. However, this is only an example for convenience of description, and exemplary embodiments of the present disclosure are not limited thereto. For example, when the repeater 1870 operates depending on L2 and/or L3 signaling, the repeater 1870 may further include a higher layer (e.g., MAC layer).

Configurations of the repeaters of FIG. 16 to FIGS. 18A/B may be classified as follows.

Type 1 repeater: The type 1 repeater may not include a signal processing unit for decoding or re-encoding a signal received from a base station or a terminal. The type 1 repeater may determine a transmission direction (e.g., slot format) or a beam direction (e.g., TCI or QCL) based on characteristics (e.g., reception signal strength, signal quality, signal-to-noise ratio, signal-to-interference plus noise ratio, reception time interval, or envelope detection of reception strength) of the radio signal received from the base station or the terminal. Therefore, the type 1 repeater may perform monitoring to determine the characteristics of the radio signal received from the base station or the terminal in a specific time/frequency resource.

Type 2 repeater: The type 2 repeater may include a signal processing unit for decoding or re-encoding cell-specific system information broadcast by a base station. As an exemplary embodiment, the cell-specific system information broadcast by the base station may mean DL/UL pattern information preconfigured when the repeater is installed or DL/UL pattern information configured through an application layer. As an another exemplary embodiment, the cell-specific system information broadcast by the base station may be slot format information (i.e., information indicating D, F or U) configured by by higher layer parameter(s) (e.g., tdd-UL-DL-ConfigurationCommon). In this case, it may be assumed that the type 2 repeater may use information corresponding to tdd-UL-DL-ConfigurationCommon of the configuration information for slot format indication, and may not use UE-specific configuration information (e.g., tdd-UL-DL-ConfigurationDedicated). Accordingly, the type 2 repeater may only detect a static or semi-static transmission direction. That is, a transmission direction of a time interval configured as flexible (F) symbols by tdd-UL-DL-ConfigurationCommon (e.g., resources configured terminal-specifically by tdd-UL-DL-ConfigurationDedicated or resources for which a transmission direction can be dynamically indicated by L1 signaling (e.g., DCI format 2_0)) cannot be determined by higher layer signaling (e.g., RRC signaling). Accordingly, the type 2 repeater may perform radio signal monitoring on the time interval configured as F symbols by tdd-UL-DL-ConfigurationCommon (e.g., resources configured terminal-specifically by tdd-UL-DL-ConfigurationDedicated or resources for which a transmission direction can be dynamically indicated by L1 signaling (e.g., DCI format 2_0)).

Type 3 repeater: The type 3 repeater may include a signal processing unit for decoding or re-encoding cell-specific system information (e.g., tdd-UL-DL-ConfigurationCommon) broadcast by a base station and configuration information for slot format indication. The configuration information for slot format indication may include one of terminal-specific configuration information (e.g., tdd-UL-DL-ConfigurationDedicated) or L1 signaling (e.g., DCI format 2_0 or other DCI formats including SFI). In an exemplary embodiment, when the configuration information for slot format indication includes only the terminal-specific configuration information (e.g., tdd-UL-DL-ConfigurationDedicated), the type 3 repeater may perform radio resource monitoring on resources (e.g., resources for which a transmission direction can be dynamically indicated by L1 signaling (e.g., DCI format 2_0)) for which a transmission direction has not been determined by the cell-specific system information (e.g., tdd-UL-DL-ConfigurationCommon) and the terminal-specific configuration information (e.g., tdd-UL-DL-ConfigurationDedicated).

Type 4 repeater: The type 4 repeater may include a signal processing unit for decoding or re-encoding cell-specific system information broadcast by a base station, terminal-specific system information, and control information (e.g., DCI). The type 4 repeater may recognize all of the above-described slot format indication procedure and application procedure by using cell-specific configuration (e.g., tdd-UL-DL-ConfigurationCommon), terminal-specific configuration (e.g., tdd-UL-DL-ConfigurationDedicated), and L1 signaling (e.g., DCI format 2_0 or other DCI formats including SFI).

Type 5 repeater: The type 5 repeater may include a signal processing unit for decoding or re-encoding control information (e.g., DCI) for slot format indication transmitted by a base station. The control information for slot format indication may be cell or group specific control information. Alternatively, the control information for slot format indication may be terminal-specific control information. The control information for slot format indication may be promised to be applied to a time interval defined or configured in advance by any one of a manufacturer who manufactures the type 5 repeater, an operator who operates the type 5 repeater, or a user who uses the type 5 repeater. The control information for slot format indication may be promised to be applied within a time interval(s) specified by the same DCI or different DCIs.

The above-described types of repeaters are examples for helping understanding, and the types of repeaters may be expanded or appropriately modified in actual application. For example, the type 2 repeater may be further classified into more detailed types. For example, the repeater may be implemented to receive only a PBCH reception (i.e., MIB). Alternatively, the repeater may be implemented to receive some or all of SIBs. Alternatively, the repeater may be implemented to receive only some (e.g., cell-specific RRC configuration) of RRC configurations.

The type 1 to type 5 repeaters may have various characteristics in terms of costs (e.g., in terms of implementation or selling costs, type 1 repeater<type 5 repeater<type 2 repeater<type 3 repeater<type 4 repeater) and performances (in terms of interference management and improvement of a throughput, type 1 repeater<type 2 repeater<type 5 repeater<type 3 repeater<type 4 repeater). Therefore, in a commercial wireless communication network, the type 1 to type 5 repeaters may coexist, and a presence of a response and a response speed to dynamic indication (e.g., slot format indication through DCI format 2_0) of the base station may be different for each repeater. The above-described difference between repeaters may be a factor to increase DL-UL cross-link interference in a TDD environment, and may cause deterioration of the performance of dynamic TDD that dynamically determines a transmission direction in a specific time resource.

First Exemplary Embodiment of Communication System

In a first exemplary embodiment of the communication system, a method in which a repeater determines a transmission direction for a specific time interval when the repeater does not explicitly receive slot format information (i.e., transmission direction) for the specific time interval from a base station will be described.

Figure 19:
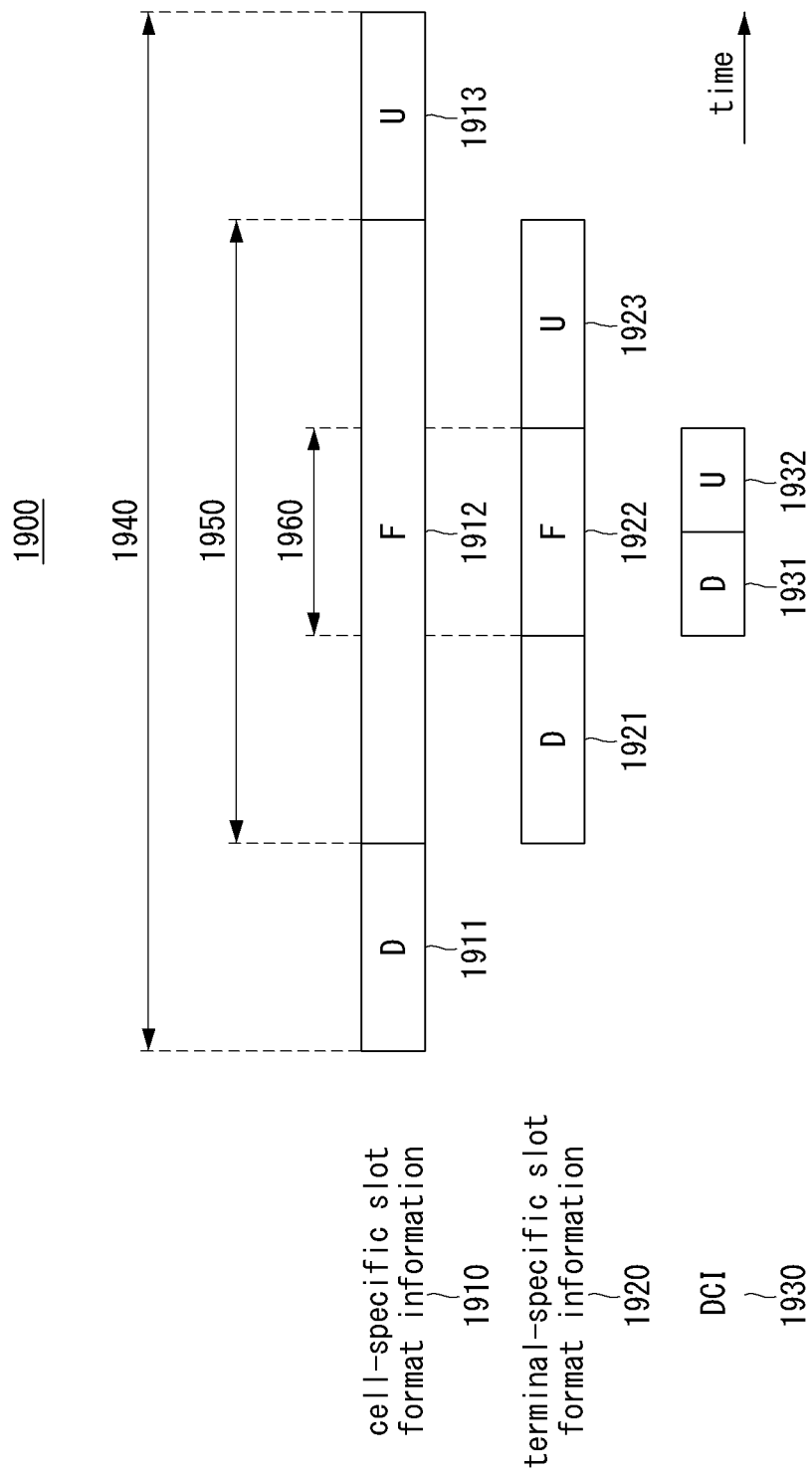
FIG. 19 is a conceptual diagram illustrating exemplary embodiments of a DL/UL pattern region that cannot be explicitly recognized according to a wireless repeater type.

FIG. 19 is a conceptual diagram illustrating exemplary embodiments of a DL/UL pattern region that cannot be explicitly recognized according to a wireless repeater type.

Referring to FIG. 19, a slot format within a specific time interval may be configured with D symbols 1911, F symbols 1912, or U symbols 1913 by cell-specific slot format information 1910 (e.g., configuration through the higher layer parameter tdd-UL-DL-ConfigurationCommon). The F symbols 1912 may be configured in detail as D symbols 1921, F symbols 1922, and U symbols 1923 by terminal-specific slot format information 1920 (e.g., configuration through the higher layer parameter tdd-UL-DL-ConfigurationDedicated). In a region configured as the F symbols 1912 by the cell-specific slot format information 1910, a region 1960 configured as F symbols 1922 by the terminal-specific slot format information 1920 may be indicated as D symbols 1931 or U symbols 1932 by DCI 1930 (e.g., SFI included in DCI format 2_0). The order of the D symbols 1911, 1921, and 1931 and the U symbols 1913, 1923, and 1933 in FIG. 19 is a simple example, and may be changed to suit an actual channel environment or operator's preference.

Since the above-described type 1 repeater does not perform decoding on signals transmitted by a base station, it may be difficult to know explicit indication of the base station on a D/F/U pattern of an entire time interval 1940 for which signals are to be relayed. Therefore, the type 1 repeater may need to perform radio signal monitoring to determine a transmission direction during the entire time interval 1940 for the signal relaying. When the type 1 repeater determines a transmission direction through the radio signal monitoring for the entire time interval 1940 for which signals are to be relayed, the determination of the transmission direction may not be completely flawless. When an error occurs with a low probability, DL-UL cross-link interference may occur in the wireless network including the type 1 repeater.

Since the above-described type 2 repeater can perform decoding on a part of the signals transmitted by the base station, it may know explicit indication of the base station on a part of the D/F/U pattern of the entire time interval 1940 for which signals are to be relayed. As an exemplary embodiment, when the type 2 repeater can decode the cell-specific slot format information 1910, the type 2 repeater may determine transmission directions of the D symbols 1911 and U symbols 1913 in the entire time interval 1940 for which signals are to be relayed without radio signal monitoring, but may need to perform radio signal monitoring to determine a transmission direction for a time interval 1950 of the F symbols 1912. When the type 2 repeater determines the transmission direction through the radio signal monitoring on the time interval 1950 of the F symbols 1912, the determination may not be completely flawless. When an error occurs with a low probability, DL-UL cross-link interference may occur in the wireless network including the type 2 repeater in the time interval 1950 of the F symbols 1912.

When the above-described type 3 repeater can decode the cell-specific slot format information 1910 and the terminal-specific slot format information 1920, the type 3 repeater is able to determine transmission directions of the D symbols 1911 and 1921 and U symbols 1913 and 1923 without radio signal monitoring, but may need to perform radio signal monitoring for identify a transmission direction of a time interval 1960 of the F symbols 1922. When the type 3 repeater determines the transmission direction through the radio signal monitoring on the time interval 1960 of the F symbols 1922, the determination may not be completely flawless. When an error occurs with a low probability, DL-UL crosslink interference may occur in the wireless network including the type 3 repeater in the time interval 1960 of the F symbols 1922.

Since the above-described type 4 repeater can perform decoding on all signals transmitted by the base station, it may know explicit indication of the base station on the D/F/U pattern of the entire time interval 1940 for which signals are to be relayed. For example, when the type 4 repeater can decode all of the cell-specific slot format information 1910, the terminal-specific slot format information 1920, and the DCI 1930 including slot format information, the type 4 repeater may know the transmission directions of the entire time period 1940 (e.g., D symbols 1911, 1921, and 1931 and U symbols 1913, 1923, and 1932) for which signals are to be relayed without radio signal monitoring. A method for the type 4 repeater to ensure reception of the DCI may be described below with reference to a second exemplary embodiment.

When the above-described type 5 repeater can decode the DCI 1930 including slot format information received through physical layer signaling, the type 5 repeater may know the transmission directions (e.g., D symbols 1931 and U symbols 1932) of the time interval (e.g., F symbols 1922) for which time directions are not determined by the terminal-specific slot format information 1920 without radio signal monitoring. However, the type 5 repeater may need to perform radio signal monitoring for determining the transmission directions for the time interval (e.g., D symbols 1911 and 1921 and U symbols 1913 and 1923) for which the DCI 1930 including slot formation information does not indicate transmission directions. When the type 5 repeater determines the transmission directions through the radio signal monitoring on the time interval (e.g., D symbols 1911 and 1921 and U symbols 1913 and 1923) for which the DCI 1930 including slot formation information does not indicate transmission directions, the determination may not be completely flawless. When an error occurs with a low probability, DL-UL crosslink interference may occur in the wireless network including the type 5 repeater in the time interval (e.g., D symbols 1911 and 1921 and U symbols 1913 and 1923) for which the DCI 1930 including slot formation information does not indicate transmission directions.

Although the exemplary embodiments of FIG. 19 have been described to be applicable to time domain resources such as frames, slots, or symbols, this is for understanding purposes and in actual application, a band, carrier (e.g., component carrier (CC)), cell, or bandwidth part (BWP) may be applied also in the frequency domain.

In the exemplary embodiments of FIG. 19, the type 1 to type 5 repeaters may need to perform radio signal monitoring for determining a transmission direction in a specific time/frequency resource according to a wireless repeater type.

Figure 20:
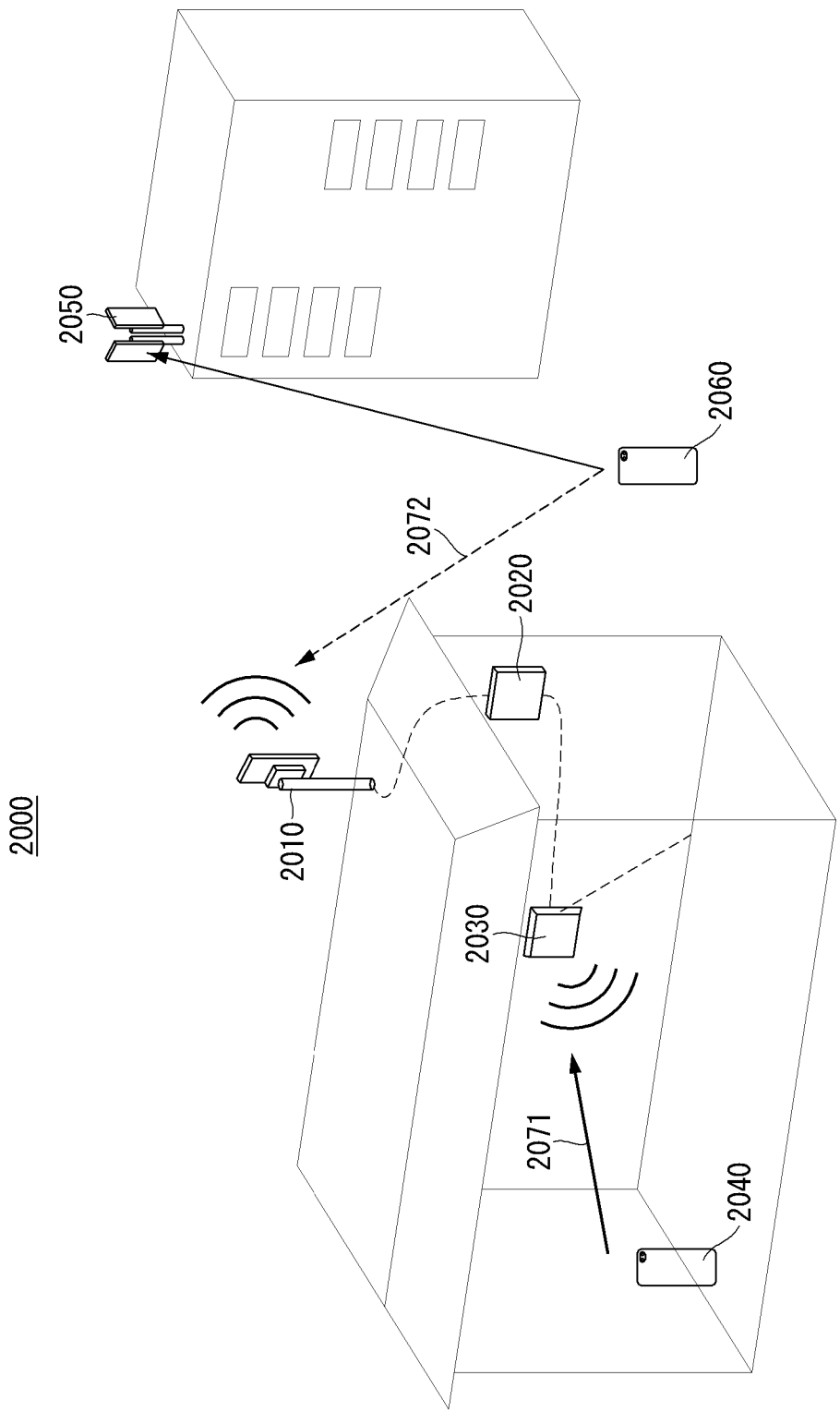
FIG. 20 is a conceptual diagram illustrating an exemplary embodiment of radio signal monitoring for determining a transmission direction of a wireless repeater.

FIG. 20 is a conceptual diagram illustrating an exemplary embodiment of radio signal monitoring for determining a transmission direction of a wireless repeater.

Referring to FIG. 20, a communication system 2000 may include one or more communication nodes. For example, the communication system 2000 may include one or more base stations and one or more terminals. The communication system 2000 may include one or more repeaters that relay communications between one or more communication nodes. FIG. 20 shows an exemplary embodiment in which one repeater relays communications between one base station existing outdoors and one terminal existing indoors. However, this is only an example for convenience of description, and exemplary embodiments of the present disclosure are not limited thereto. For example, an exemplary embodiment of the communication system 2000 may include a plurality of base stations, terminals, and/or repeaters to perform mutual communications. Hereinafter, in describing a first exemplary embodiment of radio signal monitoring for transmission direction determination by a wireless repeater with reference to FIG. 20, content overlapping with those described with reference to FIGS. 1 to 19 may be omitted.

In an exemplary embodiment of the communication system 2000, the repeater 2020 including an outdoor antenna 2010 and an indoor antenna 2030 may relay a radio signal received from an outdoor space to an indoor space. Alternatively, the repeater 2020 may relay a radio signal received in the indoor space to the outdoor space. The outdoor antenna 2010 may be referred to as 'mobile terminal (MT) antenna', 'input antenna', 'first antenna', or 'first antenna group'. The indoor antenna 2030 may be referred to as 'radio unit or remote unit (RU) antenna', 'output antenna', 'second antenna', or 'second antenna group'.

The repeater 2020 may relay communications between a terminal 2040 located indoors and a base station 2050 located outdoors. Hereinafter, configurations related to an operation in which the repeater 2020 relays a downlink signal transmitted from the base station 2050 will be described as an example. However, this is only an example for convenience of description, and exemplary embodiments of the present disclosure are not limited thereto. For example, exemplary embodiments of the present disclosure may be equally or similarly applied to an operation in which the repeater 2020 relays an uplink signal transmitted from the terminal 2040.

In another exemplary embodiment, when the repeater 2020 relays a signal of the base station 2050 to a terminal located outdoors, the outdoor antenna 2010 and the indoor antenna 2030 may be substituted with co-located antennas sharing at least one of statistical channel characteristics. Alternatively, when the repeater 2020 relays the signal of the base station 2050 to a terminal located outdoors, the outdoor antenna 2010 and the indoor antenna 2030 may be substituted with different logical antennas using the same physical antenna.

The repeater 2020 operating in a TDD carrier or an unpaired spectrum may monitor a radio signal transmitted by the base station 2050 or terminal 2040 in order to determine a transmission direction in a time/frequency resource whose transmission direction is unknown due to a reason similar to any one of those of the above-described exemplary embodiments of FIG. 19. The outdoor antenna 2010 connected to a signal processing unit of the repeater may perform radio connection with the base station 2050 in the outdoor environment. The indoor antenna 2030 connected to the signal processing unit of the repeater may perform radio connection with the terminal 2040 in the indoor environment.

When monitoring the radio signal through at least one of the outdoor antenna 2010 and the indoor antenna 2030, the repeater 2020 may determine the transmission direction based on which antenna monitors the radio signal. Alternatively, when monitoring the radio signal through both the outdoor antenna 2010 and the indoor antenna 2030, the repeater 2020 may determine the transmission direction based on which antenna detects the radio signal. For example, when the radio signal is monitored through the outdoor antenna 2010 or is detected by the outdoor antenna 2010, the repeater 2020 may determine that the base station 2050 transmits the signal, and amplify and retransmit the received signal to the terminal 2040 through the indoor antenna 2030. On the other hand, when the radio signal is monitored through the indoor antenna 2030 or is detected by the indoor antenna 2030, the repeater 2020 may determine that the terminal 2040 transmits the signal, and amplify and retransmit the received signal to the base station 2050 through the outdoor antenna 2010.

Meanwhile, when a probability that the radio signal is detected by both the outdoor antenna 2010 and the indoor antenna 2030 through monitoring of the outdoor antenna 2010 and the indoor antenna 2030 occurs, it may be difficult for the repeater 2020 to determine the transmission direction based on through which antenna the radio signal is monitored or which antenna detects the radio signal. Alternatively, even when the base station 2050 and the terminal 2040 do not transmit signals at the same time, if the terminal 2040 that the repeater 2020 should support and a terminal 2060 that the repeater 2020 does not support (e.g., a terminal which is directly connected with the base station 2050 and is close to the indoor antenna 2010) transmit uplink signals at the same time, the repeater 2020 may have difficulty in determining the transmission direction. From the point of view of the entire network, there may be no problem because only uplink signals exist. However, from the point of view of the repeater, when an uplink radio signal 2071 transmitted by the terminal 2040 is detected by the indoor antenna 2030, an uplink signal 2072 transmitted by the different terminal 2060 may be detected by the outdoor antenna 2010 at the same time. Therefore, the repeater 2010 may mistakenly recognize the uplink radio signal 2072 transmitted by the terminal 2060 as a downlink signal.

The repeater 2020 may determine which of the received signals 2071 and 2072 to amplify and retransmit. Also, the repeater 2020 may determine which of the received signals 2071 and 2072 not to amply and retransmit in consideration of potential interference to the network. The repeater 2020 may use at least one of the following first to third relay schemes in order to solve the above-described problems.

First relaying scheme: When signals are detected by both the outdoor antenna 2010 and the indoor antenna 2030 during radio signal monitoring for transmission direction determination, the repeater 2020 may not retransmit both the signals. This may be because, when DL-UL crosslink interference due to a transmission direction estimation error occurs, a loss may be greater than a performance gain due to the repeater. In particular, when the number of reception antennas of the base station 2050 is small or an interference control or cancellation capability thereof is low, the repeater 2020 may be configured to use the first relaying scheme.

Second relaying scheme: When signals are detected by both the outdoor antenna 2010 and the indoor antenna 2030 during radio signal monitoring for transmission direction determination, the repeater 2020 may retransmit both the signals. In case that the interference control or cancellation capability of the base station 2050 or the terminal 2040 is high, and in particular, in case that full duplex communication that enables simultaneous uplink/downlink transmission and reception is supported, this scheme may be an effective scheme. However, if the terminal 2040 does not support simultaneous transmission and reception in the TDD frequency, it may not be suitable for the second relaying scheme. In addition, since there is a high probability of occurrence of interference in both uplink and downlink, it may be selectively used in a limited environment (e.g., independent network).

Third relaying scheme: When signals are detected by both the outdoor antenna 2010 and the indoor antenna 2030 during radio signal monitoring for transmission direction determination, the repeater 2020 may ignore the signal received by the outdoor antenna 2010 (i.e., signal determined as downlink), and amplify and retransmit the signal received by the indoor antenna 2030 (i.e., signal determined as uplink) to the base station 2050 through the outdoor antenna 2010. The third relaying scheme may be a method in consideration of a high probability that the signal detected by the outdoor antenna 2010 of the repeater 2020 is the uplink interference signal 2072. That is, this may be in consideration of a situation in which there is a high probability that the terminal has performed uplink transmission based on configuration (e.g., terminal-specific slot format information 1920 in FIG. 19) or indication (e.g., DCI 1930) that the repeater does not explicitly recognize.

Figure 21:
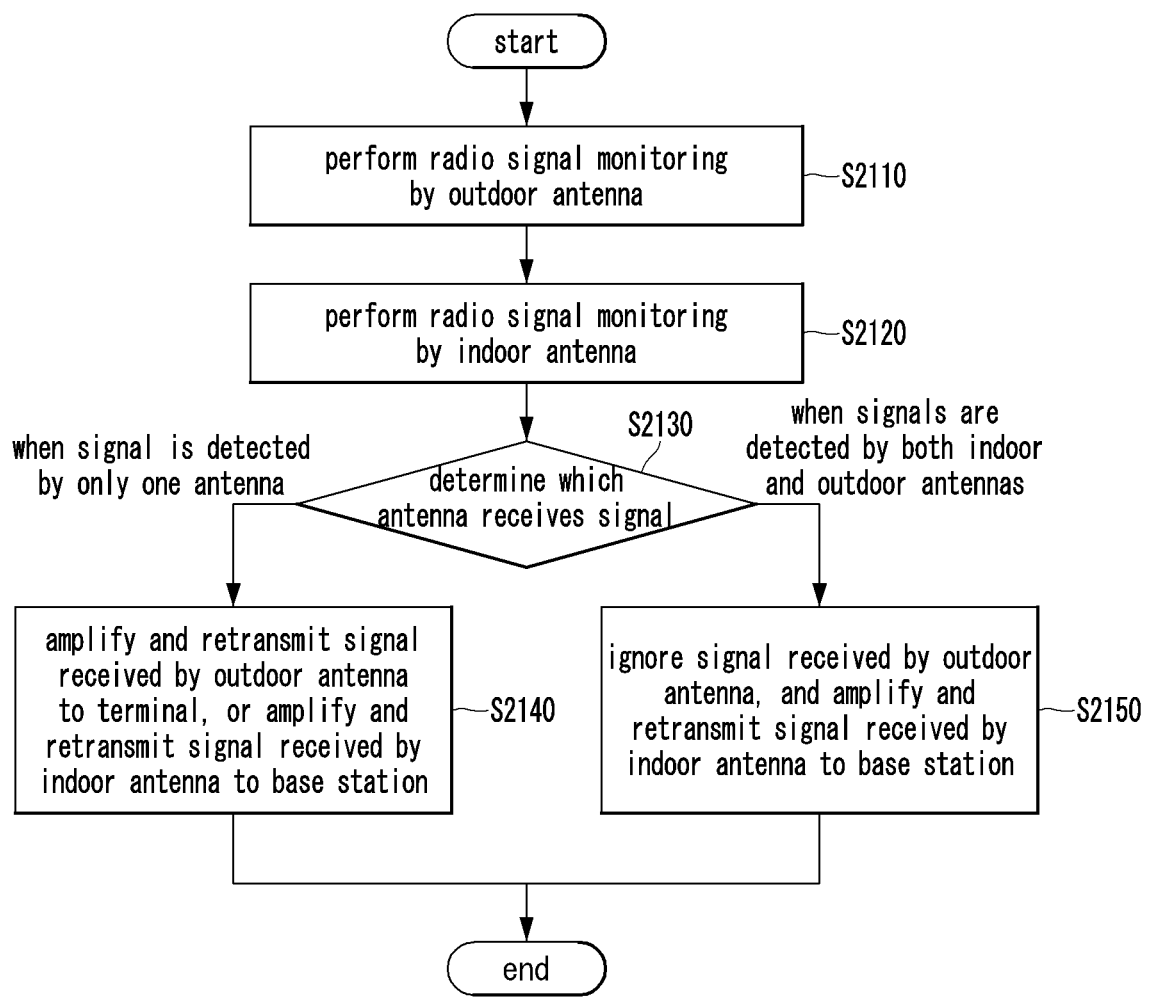
FIG. 21 is a flowchart illustrating a third relaying scheme of a wireless repeater.

FIG. 21 is a flowchart illustrating a third relaying scheme of a wireless repeater.

Referring to FIG. 21, the repeater 2020 performing the third relaying scheme described above may monitor a signal received by the outdoor antenna 2010 (S2110). The repeater 2020 may monitor a signal received by the indoor antenna 2030 (S2120). The step S2120 may be performed at the same time as the step S2110, or the steps S2120 and S2110 may be performed in different time/frequency resources grouped into the same time/frequency resource group. The repeater 2020 may determine whether a reception signal for each antenna is detected (S2130).

When a reception signal is detected only in either the step S2110 or step S2120, the repeater 2020 may amplify the signal received by the antenna that has detected the signal, and retransmit the amplified signal to the terminal 2040 or base station 2050 through the antenna by which the signal has not been detected (S21040). As an exemplary embodiment, when a signal is detected only by the outdoor antenna 2010, the repeater 2020 may amplify the received signal and retransmit it to the terminal 2040 through the indoor antenna 2030. In another exemplary embodiment, when a signal is detected only by the indoor antenna 2030, the repeater 2020 may amplify the received signal and retransmit it to the base station 2050 through the outdoor antenna 2010.

When signals are detected in both the steps S2110 and S2120, the repeater 2020 may ignore the signal received by the outdoor antenna 2010 according to the third relaying scheme described above, and amplify and retransmit the signal received by the indoor antenna 2030 to the base station 2050 through the outdoor antenna 2010 (S2150).

The above-described first to third relaying schemes do not need to be mutually exclusive, and the repeater 2020 may select an appropriate scheme for each situation or the base station 2050 may configure at least one of the first to third relaying schemes to the repeater 2020 through a higher layer parameter. In an exemplary embodiment, the repeater 2020 may be manufactured to use the third relaying scheme, and the relaying scheme to be used may be reported to the base station 2050 through capability signaling or may be specified during product testing.

In another exemplary embodiment, the base station 2050 may configure a plurality of time/frequency resources to the repeater 2020. Specifically, the base station 2050 may configure the repeater 2020 to use the first relaying scheme for some resource groups (e.g., time/frequency resource groups sensitive to interference), and use the third relaying scheme for other resource groups (e.g., time/frequency resource groups not sensitive to interference).

In yet another exemplary embodiment, the repeater 2020 may select an operation to be performed based on a reception strength of the signal measured during radio signal monitoring. When a strength of the signal (i.e., signal determined as a downlink signal) received by the outdoor antenna 2010 is less than or equal to a specific value (e.g., X dB or less), the repeater 2020 may be promised to determine the downlink signal as interference and apply the third relaying scheme. On the other hand, when the strength of the signal (i.e., signal determined as a downlink signal) received by the outdoor antenna 2010 is less than or equal to a specific value (e.g., X dB or less), the repeater 2020 may be configured by the base station to determine the downlink signal as interference and apply the third relaying scheme. X may be defined as a value obtained by subtracting a signal attenuation value such as a pathloss measured by the repeater and a margin value from a transmission power of the base station or an SSB transmission power set by the higher layer, which is a reference value. The margin value may be promised in advance or may be additionally set to the terminal through higher layer signaling (e.g., RRC signaling). Alternatively, the base station may indicate the margin value to the terminal through DCI.

In yet another exemplary embodiment, when a difference between a strength of the signal (i.e., signal determined as a downlink signal) received by the outdoor antenna 2010 and a strength of the signal (i.e., signal determined as an uplink signal) received by the indoor antenna 2030 is less than or equal to a specific value (e.g., Y dB or less), the repeater 2020 may be promised to determine that uplink transmission and downlink reception are simultaneously performed and apply the second relaying scheme. On the other hand, when the difference between the strength of the signal (i.e., signal determined as a downlink signal) received by the outdoor antenna 2010 and the strength of the signal (i.e., signal determined as an uplink signal) received by the indoor antenna 2030 is less than or equal to a specific value (e.g., Y dB or less), the repeater 2020 may be configured by the base station to determine that uplink transmission and downlink reception are simultaneously performed and apply the second relaying scheme. Y may be a value that is previously promised or set by the base station, similarly to X.

Various other applications and combinations are possible, but in order not to obscure the gist of description, all possible cases may not be listed in the present disclosure.

Second Exemplary Embodiment of Communication System

In a second exemplary embodiment of the communication system, a method for determining a dynamic slot format in consideration of a repeater type may be described.

Depending on the repeater type (e.g., type 1 to type 5 repeaters), there may be a difference in the explicit slot format configuration and indication that each repeater can recognize. Therefore, PDCCH monitoring resources (e.g., PDCCH monitoring time, PDCCH monitoring occasion (MO), time resource position of a search space, time/frequency resource position of a CORESET, or a combination thereof), that the repeater can recognize, may be different according to the repeater type. For example, the PDCCH monitoring resources may be configured by parameters of various types such as higher layer parameters (e.g., pdcch-ConfigSIB1) in the MIB, higher layer parameters including cell-specific PDCCH configuration values (e.g., PDCCH-ConfigCommon), and higher layer parameters including terminal-specific PDCCH configuration values (e.g., PDCCH-Config). That is, the PDCCH monitoring resources that the repeater can recognize may vary according to the repeater type (e.g., type 1 to type 5 repeaters). As a result, whether the repeater can receive the DCI including the SFI may vary depending on through which PDCCH monitoring resource the base station transmits the DCI including the SFI.

The base station may limit the DCI including the SFI to be included only in a specific PDCCH monitoring resource so that a large number of repeaters (e.g., type 3 repeater when the configuration information for slot format indication includes only L1 signaling (e.g., DCI format 2_0 or other DCI formats including the SFI), type 4 repeater, or type 5 repeater) can recognize the SFI. That is, the repeater (e.g., type 3 repeater when the configuration information for slot format indication includes only L1 signaling (e.g., DCI format 2_0 or other DCI formats including the SFI), type 4 repeater, or type 5 repeater) may ignore DCI including SFI transmitted from resources other than the specific PDCCH monitoring resource.

Figure 22:
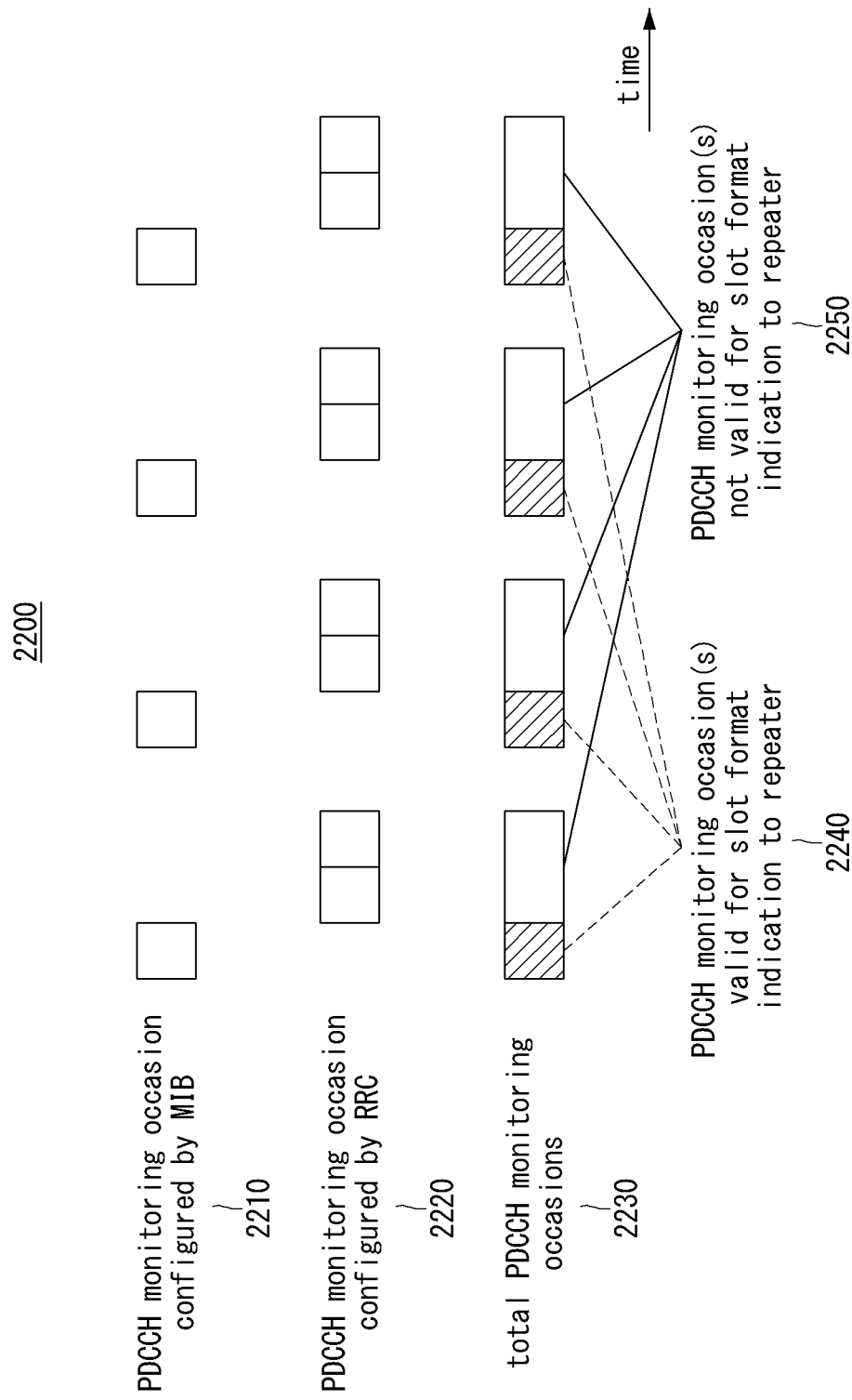
FIG. 22 is a conceptual diagram illustrating an exemplary embodiment of an SFI transmission method in consideration of a wireless repeater.

FIG. 22 is a conceptual diagram illustrating an exemplary embodiment of an SFI transmission method in consideration of a wireless repeater.

Referring to FIG. 22, when there are a PDCCH monitoring resource 2210 configured by the MIB (e.g., PDCCH resource determined with reference to pdcch-ConfigSIB1) and a PDCCH monitoring resource 2220 configured by higher layer signaling (e.g., PDCCH resource determined by referring to PDCCH-ConfigCommon or PDCCH-Config configured by RRC signaling), the base station may know that the repeater can explicitly recognize only the PDCCH monitoring resource 2210 configured by the MIB. The base station may determine that the PDCCH monitoring resource 2210 configured by the MIB is a resource 2240 suitable for transmitting DCI including the SFI to the repeater. However, the base station may determine the PDCCH resource 2220 configured by higher layer signaling (e.g., PDCCH resource determined by referring to PDCCH-ConfigCommon or PDCCH-Config configured by RRC signaling) as a resource 2250 that the repeater cannot recognize, and may not use it for transmission of DCI including SFI.

In the exemplary embodiment of FIG. 22, the definition of the PDCCH monitoring resource 2240 suitable for DCI transmission including SFI or the inappropriate PDCCH monitoring resource 2250 may be appropriately changed and applied. For example, the PDCCH monitoring resource 2240 suitable for DCI transmission including SFI may be defined as a PDCCH resource determined with reference to pdcch-ConfigSIB1 to PDCCH-ConfigCommon, and the base station may define the PDCCH monitoring resource 2240 suitable for DCI transmission including SFI as a cell-specific PDCCH resource. In this case, the PDCCH monitoring resource 2250 that is not suitable for DCI transmission including SFI may be defined as a PDCCH resource determined with reference to PDCCH-Config.

The configurations described through the first to second exemplary embodiments of the communication system are not necessarily mutually exclusive, and the configurations proposed in the plurality of exemplary embodiments may be combined and applied. For example, the repeater may determine a transmission direction using the third relaying scheme of the first exemplary embodiment of the communication system and simultaneously receive the SFI from the base station based on the second exemplary embodiment of the communication system. The repeater may report information on whether to apply or not apply to each of the components described through the first and second exemplary embodiments of the communication system to the base station. Based on the information reported from the repeater, the base station may select one or more configurations to be applied to communications with the repeater or communications with the terminal through relaying of the repeater among the configurations described through the first and second exemplary embodiments of the communication system. The base station may indicate information on operations to be performed by the repeater through L1 signaling or higher layer signaling based on the one or more selected configurations.

Figure 23:
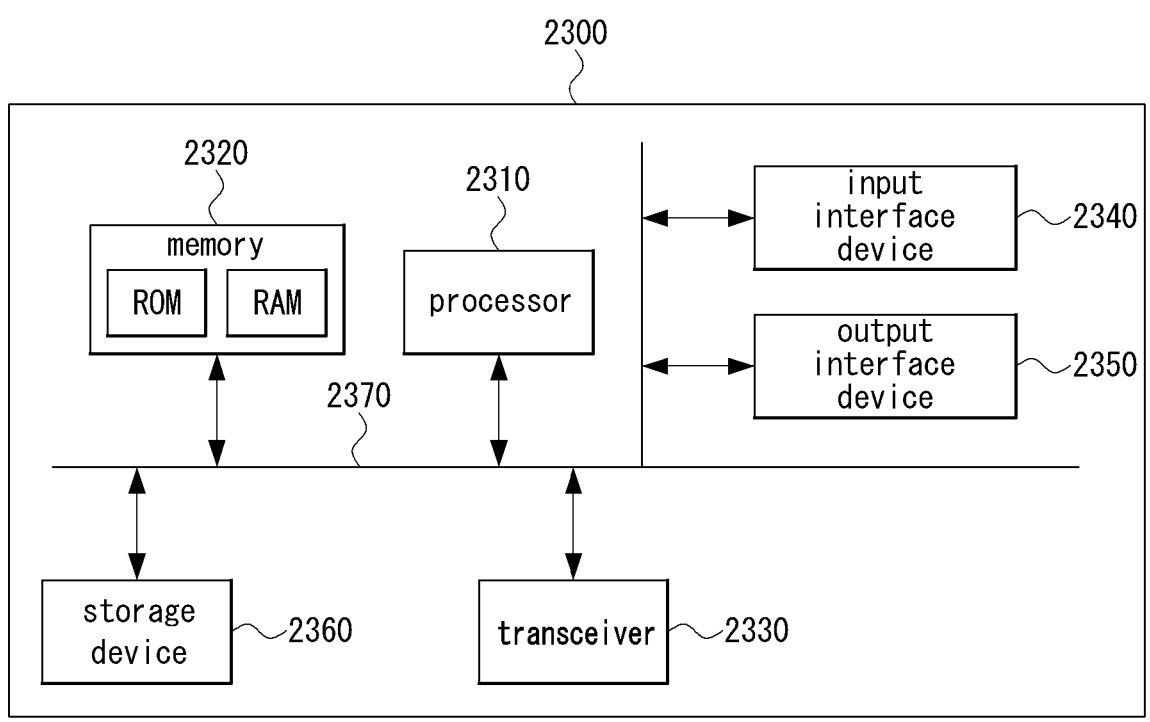
FIG. 23 is a block diagram illustrating an exemplary embodiment of a communication node constituting a communication system.

FIG. 23 is a block diagram illustrating an exemplary embodiment of a communication node constituting a communication system.

Referring to FIG. 23, a communication node 2300 may comprise at least one processor 2310, a memory 2320, and a transceiver 2330 connected to the network for performing communications. Also, the communication node 2300 may further comprise an input interface device 2340, an output interface device 2350, a storage device 2360, and the like. The respective components included in the communication node 2300 may communicate with each other as connected through a bus 2370.

However, each component included in the communication node 2300 may be connected to the processor 2310 via an individual interface or a separate bus, rather than the common bus 2370. For example, the processor 2310 may be connected to at least one of the memory 2320, the transceiver 2330, the input interface device 2340, the output interface device 2350, and the storage device 2360 via a dedicated interface.

The processor 2310 may execute a program stored in at least one of the memory 2320 and the storage device 2360. The processor 2310 may refer to a central processing unit (CPU), a graphics processing unit (GPU), or a dedicated processor on which methods in accordance with embodiments of the present disclosure are performed. Each of the memory 2320 and the storage device 2360 may be constituted by at least one of a volatile storage medium and a non-volatile storage medium. For example, the memory 2320 may comprise at least one of read-only memory (ROM) and random access memory (RAM).

The communication node 2300 may correspond to any one of communication nodes constituting the exemplary embodiments of the communication system described with reference to FIGS. 1 to 22. In an exemplary embodiment of the communication system, the communication node 2300 may correspond to a base station. For example, the communication node 2300 may perform the same or similar operations to those of the base station described with reference to FIGS. 19 to 22. The processor 2310 of the communication node 2300 executes instructions for an operation of determining which method to use among the methods of the first and second exemplary embodiments of the communication system, and an operation of instructing the repeater to use the determined method.

On the other hand, the communication node 2300 may correspond to a repeater. For example, the communication node 2300 may perform the same or similar operations to those of the repeater described with reference to FIGS. 19 to 22. The processor 2310 of the communication node 2300 executes instructions for an operation of amplifying a radio signal transmitted by a base station, an operation of analyzing the radio signal transmitted by the base station, an operation of retransmitting the amplified radio signal, and operations based on the analyzed signals.

However, the effects that can be achieved by the signal transmission and reception method and apparatus in the wireless communication system according to the exemplary embodiments of the present disclosure are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a repeater performing relaying between a base station and a first terminal in a communication system, the operation method comprising:
   receiving one or more signals from at least one of the base station and the first terminal;
   performing monitoring on the one or more signals in a time interval for which a transmission direction is not determined by the base station; and
   determining the transmission direction of the time interval based on a result of the monitoring,
   wherein the one or more signals include at least one of a first signal received from the base station or a second signal received from the first terminal,
   wherein the operation method further comprises retransmitting the first signal to the first terminal when the result of the monitoring indicates that the first signal is detected only by a first antenna included in the repeater, and retransmitting the second signal to the base station when the result of the monitoring indicates that the second signal is detected only by a second antenna included in the repeater, and
   wherein the first antenna is an antenna wirelessly connected to the base station, and the second antenna is an antenna wirelessly connected to the first terminal.

2. The operation method according to claim 1, further comprising, when the result of the monitoring indicates that signals are respectively received by the first antenna and the second antenna included in the repeater, retransmitting the first signal detected by the first antenna to the first terminal, and retransmitting the second signal detected by the second antenna to the base station.

3. The operation method according to claim 1, further comprising, when the result of the monitoring indicates that signals are respectively received by the first antenna and the second antenna included in the repeater, retransmitting only the second signal detected by the second antenna to the base station.

4. An operation method of a repeater performing relaying between a base station and a first terminal in a communication system, the operation method comprising:
   receiving slot format information from the base station;
   monitoring one or more reception signals in a time interval for which a transmission direction is not determined based on the slot format information; and
   determining the transmission direction of the time interval based on a result of the monitoring,
   wherein the one or more reception signals include at least one of a first reception signal received from the base station or a second reception signal received from the first terminal, and the slot format information includes at least one of cell-specific slot format information, terminal-specific slot format information, control information including a slot format indication (SFI), or a combination thereof,
   wherein the transmission direction of the time interval is determined based on at least one of a signal strength, signal quality, signal-to-noise ratio, signal-to-interference plus noise ratio, reception time interval, or envelope detection of a reception strength for the one or more reception signals.

5. The operation method according to claim 4, wherein at least one of the cell-specific slot format information, the terminal-specific slot format information, or the control information is decoded by a signal processing unit included in the repeater.

6. The operation method according to claim 4, wherein the time interval is determined based on a decoding range for the slot format information, is a time interval for which a transmission direction is not determined according to the cell-specific slot format information when only the cell-specific slot format information is decoded, is a time interval for which a transmission direction is not determined according to the terminal-specific slot format information when the cell-specific slot format information and the terminal-specific slot format information are decoded, or is a time interval excluding a time interval for which the control information indicates a transmission direction when only the control information is decoded.

7. The operation method according to claim 4, wherein the transmission direction of the time interval is determined as a downlink direction when one of first and second antennas included in the repeater by which the monitoring is performed is the first antenna, and is determined as an uplink direction when one of the first and second antennas included in the repeater by which the monitoring is performed is the second antenna, wherein the first antenna is an antenna wirelessly connected to the base station, and the second antenna is an antenna wirelessly connected to the first terminal.

8. The operation method according to claim 4, wherein the transmission direction of the time interval is determined as a downlink direction when one of first and second antenna included in the repeater by which a reception signal is detected is the first antenna, and is determined as an uplink direction when one of the first and second antenna included in the repeater by which a reception signal is detected is the second antenna, wherein the first antenna is an antenna wirelessly connected to the base station, and the second antenna is an antenna wirelessly connected to the first terminal.

9. The operation method according to claim 4, wherein the determining of the transmission direction of the time interval comprises:

when both a first antenna and a second antenna included in the repeater detect reception signals, determining that a signal received by the first antenna is an interference signal from a second terminal not serviced by the repeater; and determining the transmission direction of the time interval as an uplink direction, wherein the first antenna is an antenna wirelessly connected to the base station, and the second antenna is an antenna wirelessly connected to the first terminal.

10. The operation method according to claim 9, wherein when a strength of the signal received by the first antenna is X dB or less, the signal received by the first antenna is determined as an interference signal from the second terminal, X is a value obtained by subtracting a signal attenuation value measured by the repeater and a margin value from a transmission power of the base station, and the margin value is a value set by at least one of higher layer signaling or the control information.

11. A repeater performing relaying between a base station and a first terminal in a communication system, the repeater comprising:

a processor;

a memory electronically communicating with the processor; and instructions stored in the memory, wherein when executed by the processor, the instructions cause the repeater to:

receive slot format information from the base station;

monitor one or more reception signals in a time interval for which a transmission direction is not determined based on the slot format information;

when both a first antenna and a second antenna included in the repeater detect reception signals, determine that a signal received by the first antenna is an interference signal from a second terminal not serviced by the repeater; and determine a transmission direction of the time interval as an uplink direction, wherein the one or more reception signals include at least one of a first reception signal received from the base station or a second reception signal received from the first terminal, and the slot format information includes at least one of cell-specific slot format information, terminal-specific slot format information, control information including a slot format indication (SFI), or a combination thereof, wherein the first antenna is an antenna wirelessly connected to the base station, and the second antenna is an antenna wirelessly connected to the first terminal, and wherein when a strength of the signal received by the first antenna is X dB or less, the signal received by the first antenna is determined as an interference signal from the second terminal, X is a value obtained by subtracting a signal attenuation value measured by the repeater and a margin value from a transmission power of the base station, and the margin value is a value set by at least one of higher layer signaling or the control information.

12. The repeater according to claim 11, wherein at least one of the cell-specific slot format information, the terminal-specific slot format information, or the control information is decoded by a signal processing unit included in the repeater.

13. The repeater according to claim 11, wherein the time interval is determined based on a decoding range for the slot format information, is a time interval for which a transmission direction is not determined according to the cell-specific slot format information when only the cell-specific slot format information is decoded, is a time interval for which a transmission direction is not determined according to the terminal-specific slot format information when the cell-specific slot format information and the terminal-specific slot format information are decoded, or is a time interval excluding a time interval for which the control information indicates a transmission direction when only the control information is decoded.

14. The repeater according to claim 11, wherein the transmission direction of the time interval is determined based on at least one of a signal strength, signal quality, signal-to-noise ratio, signal-to-interference plus noise ratio, reception time interval, or envelope detection of a reception strength for the one or more reception signals.

15. The repeater according to claim 11, wherein the transmission direction of the time interval is determined as a downlink direction when one of first and second antennas included in the repeater by which the monitoring is performed is the first antenna, and is determined as an uplink direction when one of the first and second antennas included in the repeater by which the monitoring is performed is the second antenna, wherein the first antenna is an antenna wirelessly connected to the base station, and the second antenna is an antenna wirelessly connected to the first terminal.

16. The repeater according to claim 11, wherein the transmission direction of the time interval is determined as a downlink direction when one of first and second antenna included in the repeater by which a reception signal is detected is the first antenna, and is determined as an uplink direction when one of the first and second antenna included in the repeater by which a reception signal is detected is the second antenna, wherein the first antenna is an antenna wirelessly connected to the base station, and the second antenna is an antenna wirelessly connected to the first terminal.

\* \* \* \* \*